United States Patent
Nishio et al.

(10) Patent No.: US 11,814,157 B2
(45) Date of Patent: Nov. 14, 2023

(54) UNMANNED AERIAL VEHICLE AND DRIVE METHOD

(71) Applicant: SONY CORPORATION, Tokyo (JP)

(72) Inventors: Masato Nishio, Tokyo (JP); Satoshi Ueki, Tokyo (JP); Kenichi Sano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 354 days.

(21) Appl. No.: 17/250,321

(22) PCT Filed: Jul. 1, 2019

(86) PCT No.: PCT/JP2019/026018
§ 371 (c)(1),
(2) Date: Jan. 4, 2021

(87) PCT Pub. No.: WO2020/012996
PCT Pub. Date: Jan. 16, 2020

(65) Prior Publication Data
US 2021/0269143 A1   Sep. 2, 2021

(30) Foreign Application Priority Data
Jul. 12, 2018   (JP) .................................. 2018-132019

(51) Int. Cl.
*B64C 17/02* (2006.01)
*B64C 39/02* (2023.01)
*B64U 10/13* (2023.01)
*B64U 30/20* (2023.01)
*B64U 50/19* (2023.01)
*B64U 101/30* (2023.01)

(52) U.S. Cl.
CPC ............ *B64C 17/02* (2013.01); *B64C 39/024* (2013.01); *B64U 10/13* (2023.01); *B64U 30/20* (2023.01); *B64U 50/19* (2023.01); *B64U 2101/30* (2023.01); *B64U 2201/10* (2023.01)

(58) Field of Classification Search
CPC ................................ B64C 17/02; B64U 10/13
See application file for complete search history.

(56) References Cited

U.S. PATENT DOCUMENTS

| | | | |
|---|---|---|---|
| 9,550,561 B1 * | 1/2017 | Beckman | G01M 1/127 |
| 9,908,619 B1 * | 3/2018 | Beckman | B64C 39/024 |
| 2016/0272310 A1 * | 9/2016 | Chan | B64C 27/37 |
| 2017/0129591 A1 | 5/2017 | High | |

(Continued)

FOREIGN PATENT DOCUMENTS

| CN | 205311892 U | 6/2016 |
|---|---|---|
| CN | 206856983 U | 1/2018 |

(Continued)

*Primary Examiner* — Richard G Davis
(74) *Attorney, Agent, or Firm* — CHIP LAW GROUP

(57) ABSTRACT

The present technology relates to an unmanned aerial vehicle, a drive method, and a program that make it possible to easily balance an airframe. An unmanned aerial vehicle includes: a plurality of motors that rotates a plurality of propellers; a movable part that moves a center-of-gravity position adjustment member; and a control unit that controls movement of the center-of-gravity position adjustment member by the movable part. The present technology can be applied to unmanned aerial vehicles.

21 Claims, 9 Drawing Sheets

(56) References Cited

U.S. PATENT DOCUMENTS

2020/0183425 A1* 6/2020 Yamashita .............. B64C 13/16
2021/0124373 A1* 4/2021 Miller .................... B64U 50/19

FOREIGN PATENT DOCUMENTS

| JP | 07-017491 A | 1/1995 |
| JP | 11-278391 A | 10/1999 |
| JP | 2006-142913 A | 6/2006 |
| JP | 2007-261414 A | 10/2007 |
| JP | 2017-193321 A | 10/2017 |
| JP | 2018-191156 A | 11/2018 |
| KR | 20090101413 A | 9/2009 |

* cited by examiner

UNMANNED AERIAL VEHICLE AND DRIVE METHOD

CROSS REFERENCE TO RELATED APPLICATIONS

This application is a U.S. National Phase of International Patent Application No. PCT/JP2019/026018 filed on Jul. 1, 2019, which claims priority benefit of Japanese Patent Application No. JP 2018-132019 filed in the Japan Patent Office on Jul. 12, 2018. Each of the above-referenced applications is hereby incorporated herein by reference in its entirety.

TECHNICAL FIELD

The present technology relates to an unmanned aerial vehicle, a drive method, and a program, and in particular, relates to an unmanned aerial vehicle, a drive method, and a program that make it possible to easily balance an airframe.

BACKGROUND ART

In recent years, unmanned aerial vehicles have been used for carrying luggage and taking pictures with cameras.

Such an unmanned aerial vehicle flies by rotating a plurality of propellers, and flies in a desired direction by adjusting the rotation speed of each of the plurality of propellers during flight.

Incidentally, as a technology that adjusts the position of the center of gravity of an airframe, there has been proposed a technology in which the position of the center of gravity of a helicopter is always positioned on the axis of the main rotor shaft by moving a movable part provided with a main rotor and a tail rotor relative to the fuselage of the helicopter (See Patent Document 1, for example). Use of this technology allows for balance adjustment of the airframe of the helicopter.

CITATION LIST

Patent Document

Patent Document 1: Japanese Patent Application Laid-Open No. H7-17491

SUMMARY OF THE INVENTION

Problems to be Solved by the Invention

However, in an unmanned aerial vehicle in which a movable part such as a motor that drives a propeller and an airframe, i.e., a fuselage, are integrated, it is not possible to balance the airframe by adjusting the position of the center of gravity by the technology described in Patent Document 1.

The present technology has been made in view of such a situation, and is intended to make it possible to easily balance an airframe.

Solutions to Problems

An unmanned aerial vehicle according to a first aspect of the present technology includes a plurality of motors that rotates a plurality of propellers, a movable part that moves a center-of-gravity position adjustment member, and a control unit that controls movement of the center-of-gravity position adjustment member by the movable part.

With a drive method or a program according to a first aspect of the present technology, an unmanned aerial vehicle having a plurality of motors that rotates a plurality of propellers and a movable part that moves a center-of-gravity position adjustment member controls movement of the center-of-gravity position adjustment member by the movable part.

According to a first aspect of the present technology, in an unmanned aerial vehicle having a plurality of motors that rotates a plurality of propellers and a movable part that moves a center-of-gravity position adjustment member, movement of the center-of-gravity position adjustment member by the movable part is controlled.

An unmanned aerial vehicle according to a second aspect of the present technology includes a movable part that moves a plurality of adjustment members, and a control unit that adjusts an orientation of an airframe on the basis of prediction information indicating a direction and force of a generated wind, and that controls movement of the adjustment members by the movable part so that the plurality of the adjustment members is moved in a plurality of directions different from one another and away from a center position of the airframe.

With a drive method or a program according to a second aspect of the present technology, an unmanned aerial vehicle having a movable part that moves a plurality of adjustment members adjusts an orientation of an airframe on the basis of prediction information indicating a direction and force of a generated wind, and that controls movement of the adjustment members by the movable part so that the plurality of the adjustment members is moved in a plurality of directions different from one another and away from a center position of the airframe.

According to a second aspect of the present technology, in an unmanned aerial vehicle having a movable part that moves a plurality of adjustment members, an orientation of an airframe is adjusted on the basis of prediction information indicating a direction and force of a generated wind, and movement of the adjustment members by the movable part is controlled so that the plurality of the adjustment members is moved in a plurality of directions different from one another and away from a center position of the airframe.

Effects of the Invention

According to the first aspect and the second aspect of the present technology, it is possible to easily balance an airframe.

It is to be noted that the effects described herein are not necessarily limited, and may be any effect described in the present disclosure.

MODE FOR CARRYING OUT THE INVENTION

Embodiments to which the present technology is applied will be described below with reference to the drawings.

First Embodiment

<About Present Technology>

The present technology is to adjust the position of the center of gravity of an unmanned aerial vehicle having a plurality of propellers by moving a center-of-gravity position adjustment member while maintaining the positional relationship between a movable part such as a propeller and a motor and an airframe of the unmanned aerial vehicle on the basis of the rotation speed of the motor that rotates the propeller. This makes it possible to easily balance an airframe.

It is to be noted that the center-of-gravity position adjustment member may be anything such as a battery mounted on the unmanned aerial vehicle, a weight for center-of-gravity position adjustment, and a payload (load) loaded on the unmanned aerial vehicle. However, a case where the center-of-gravity position adjustment member is a battery will be described below.

For example, when a payload such as a gimbal camera, various sensors, and a load is mounted on an unmanned aerial vehicle, the position of the center of gravity of the unmanned aerial vehicle changes depending on the weight and mounting position of the payload. In addition, the unmanned aerial vehicle has a characteristic that the battery occupies most of the airframe weight.

Therefore, in the present technology, by taking advantage of such characteristic, the position of the center of gravity of the airframe of an unmanned aerial vehicle is optimized by moving the battery relative to the airframe.

The present technology will be described below in more detail.

In general, the airframe control of an unmanned aerial vehicle is performed by a motor of a propeller part in accordance with the weight of the payload to be mounted on the unmanned aerial vehicle.

Figure 1:
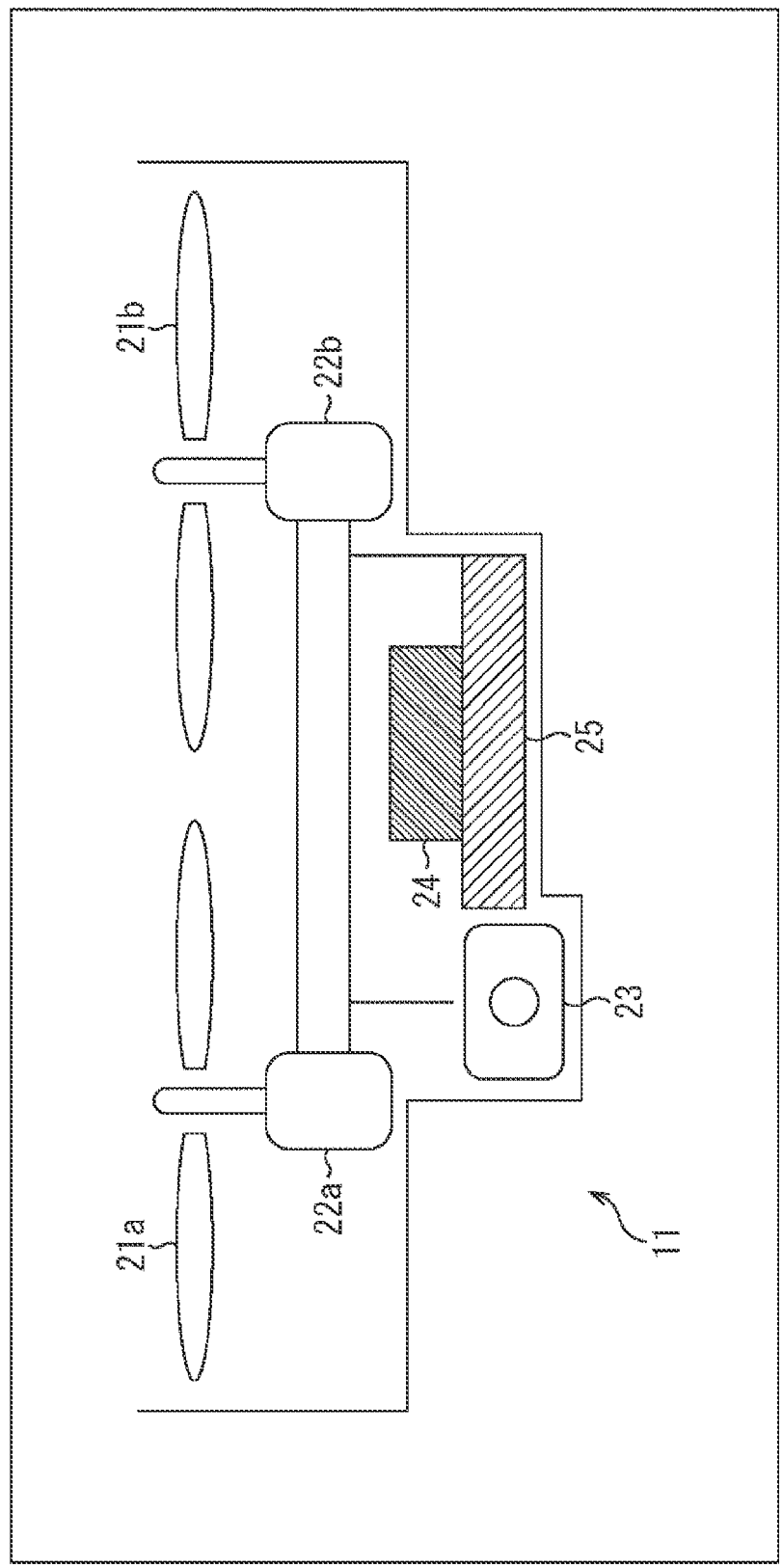
FIG. 1 is a diagram explaining adjustment of the position of the center of gravity.

Specifically, for example, the external configuration of an unmanned aerial vehicle is as in FIG. 1. It is to be noted that FIG. 1 is a front view of an unmanned aerial vehicle 11.

In this example, the unmanned aerial vehicle 11 is provided with a propeller 21a and a propeller 21b, which are drive units that drive (fly) the unmanned aerial vehicle 11, and a motor 22a and a motor 22b, which are rotation drive unit that rotate the propeller 21a and the propeller 21b.

In particular, here, the propeller 21a and the propeller 21b are disposed side by side on a two-dimensional plane, for example, and the motor 22a and the motor 22b have a rotation speed detection function that detects the rotation speeds of themselves, i.e., the rotation speeds of the propeller 21a and the propeller 21b.

It is to be noted that hereinafter, the propeller 21a and the propeller 21b will be referred to simply as the propeller 21 in a case where there is no particular need to distinguish them from each other, and the motor 22a and the motor 22b will be referred to simply as the motor 22 in a case where there is no particular need to distinguish them from each other. In addition, hereinafter, the rotation speed of the motor 22a is also referred specifically to as the rotation speed ra, and the rotation speed of the motor 22b is also referred specifically to as the rotation speed rb.

The unmanned aerial vehicle 11 is provided with a gimbal camera 23 that functions as an image-capturing unit that captures an image of a surrounding object, and a battery 24 that supplies electric power to each unit of the unmanned aerial vehicle 11.

Furthermore, since here the battery 24 is a center-of-gravity position adjustment member for adjusting the position of the center of gravity of the unmanned aerial vehicle 11, the unmanned aerial vehicle 11 is provided with a battery movable part 25 for moving the battery 24.

For example, as in the example of FIG. 1, in a case where the battery 24 is positioned approximately at the center with respect to the unmanned aerial vehicle 11 and the gimbal camera 23 is positioned on the left side in the figure, the position of the center of gravity of the unmanned aerial vehicle 11 deviates from the center to the left side in the figure, i.e., the propeller 21a side. This is because the gimbal camera 23 present on the left side in the figure relative to the center of the unmanned aerial vehicle 11 is heavier than the battery 24 and the battery movable part 25 that are present on the right side in the figure relative to the center of the unmanned aerial vehicle 11.

In such a case, since the unmanned aerial vehicle 11 is inclined to the left side in the figure, i.e., the propeller 21a side, the unmanned aerial vehicle 11 increases the rotation speed ra so that the rotation speed ra is greater than the rotation speed rb in order to maintain the balance of the airframe. With this arrangement, the unmanned aerial vehicle 11 becomes horizontal with respect to the ground, and the balance is maintained.

On the contrary, in a case where the unmanned aerial vehicle 11 is inclined to the right side in the figure, i.e., the propeller 21b side, the unmanned aerial vehicle 11 increases the rotation speed rb so that the rotation speed rb is controlled to be greater than the rotation speed ra, and the balance of the airframe is maintained.

Here, as in the example shown in FIG. 1, in a case where the gimbal camera 23 is disposed on the propeller 21a side of the unmanned aerial vehicle 11 and the center of gravity of the airframe deviates to the propeller 21a side, the rotation speed ra>rotation speed rb is continuously maintained during flight of the unmanned aerial vehicle 11.

If the state where the rotation speed ra is always greater than the rotation speed rb continues in this way, deterioration of the motor 22a progresses as compared with the motor 22b.

Since the degree of deterioration of each motor 22 becomes imbalanced when the position of the center of gravity of the unmanned aerial vehicle 11 becomes imbalanced, it is preferable that the position of the center of gravity of the unmanned aerial vehicle 11 is positioned at the center of the airframe so that the rotation speed of each motor 22 becomes equal as much as possible.

Therefore, in the present technology, in order to balance the airframe of the unmanned aerial vehicle 11, the position of the center of gravity of the airframe is adjusted first by moving the battery 24 in accordance with the weight and arrangement position of the payload such as the gimbal camera 23 before the control by the motor 22 is performed.

Specifically, in the example of FIG. 1, since the center of gravity of the airframe of the unmanned aerial vehicle 11 deviates to the propeller 21a side due to the mounting of the gimbal camera 23, the battery movable part 25 adjusts the center of gravity by moving the battery 24 to the propeller 21b side.

In particular, here, the battery movable part 25 can move the battery 24 in the left-right direction in the figure, and adjustment is performed so that the position of the center of gravity of the airframe becomes the center position of the unmanned aerial vehicle 11 by moving the battery 24 to the propeller 21b side.

It is to be noted that hereinafter, the direction of the propeller 21a as viewed from the center of the unmanned aerial vehicle 11 will be referred also to as an A side in particular, and the direction of the propeller 21b as viewed from the center of the unmanned aerial vehicle 11 will be referred also to as a B side in particular. In addition, hereinafter, the center position of the airframe of the unmanned aerial vehicle 11 will be referred also to as an airframe center position.

Thus, the battery movable part 25 can independently move the battery 24 to the A side or the B side with respect to the airframe of the unmanned aerial vehicle 11 while maintaining (not changing) the positional relationship between the airframe and the propeller 21 and the motor 22.

However, there is a limit to movement of the battery 24 by the battery movable part 25, and if the battery 24 is moved to the A side or the B side to some extent, it sometimes becomes impossible to further move the battery 24 to the A side or the B side due to physical restrictions.

For example, the position closest to the A side in the movable range of the battery 24 is referred to as an A side end, and the position closest to the B side in the movable range of the battery 24 is referred to as a B side end.

In this case, the position of the battery 24 cannot be moved further on to the A side over the A side end, and similarly, the position of the battery 24 cannot be moved further on to the B side over the B side end.

Depending on the weight and arrangement position of the payload such as the gimbal camera 23, the position of the center of gravity of the unmanned aerial vehicle 11 may not be at the airframe center position even if the battery 24 is moved to the A side end or the B side end. Thus, only in a case where the position of the center of gravity cannot be adjusted any more by the movement of the battery 24, the unmanned aerial vehicle 11 adjusts the rotation speed of each motor 22 from that state to maintain the balance of the airframe.

For example, after takeoff of the unmanned aerial vehicle 11, the unmanned aerial vehicle 11 evaluates the rotation speed ra and the rotation speed rb in a state where the unmanned aerial vehicle 11 is kept horizontal (balanced).

At this time, for example, if a difference (ra−rb) between the rotation speed ra and the rotation speed rb is equal to or greater than a predetermined positive threshold value |t|, the battery 24 is moved to the B side (B direction) by a predetermined unit change amount.

Then, since the battery 24 is moved, the unmanned aerial vehicle 11 controls the rotation speed of each motor 22 so that the balance of the airframe is maintained, and hence the rotation speed ra and the rotation speed rb are evaluated again thereafter, and the movement of the battery 24 and the evaluation of the rotation speed are repeated until the difference (ra−rb) becomes less than the threshold value |t|.

Similarly, as a result of evaluation of the rotation speed of the unmanned aerial vehicle 11 after takeoff, if the difference (ra−rb) is equal to or less than a predetermined negative threshold value −|t|, the battery 24 is moved to the A side (A direction) by a predetermined unit change amount.

Then, since the rotation speed of each motor 22 is controlled in accordance with the movement of the battery 24, the rotation speed ra and the rotation speed rb are evaluated again thereafter, and the movement of the battery 24 and the evaluation of the rotation speed are repeated until the difference (ra−rb) becomes larger than the threshold value −|t|.

Thus, in the unmanned aerial vehicle 11, in a case where the difference (ra−rb) is not a value within a predetermined range determined from the threshold value |t| and the threshold value −|t|, the position of the center of gravity of the airframe is adjusted by the movement of the battery 24. It is to be noted that here, the predetermined range is a range of values larger than the threshold value −|t| and smaller than the threshold value |t|.

In this manner, the unmanned aerial vehicle 11 compares the rotation speeds of the motors 22, and moves the battery 24 in a direction corresponding to the comparison result. With this arrangement, the position of the center of gravity of the unmanned aerial vehicle 11 can be adjusted by moving the battery 24 by an appropriate distance in an appropriate direction in accordance with the weight and arrangement position of the payload such as the gimbal camera 23 mounted on the unmanned aerial vehicle 11.

It is to be noted that the case where the number of the motors 22 provided in the unmanned aerial vehicle 11 is two has been described as an example, but the position of the center of gravity can be adjusted by the similar processing even in a case where the number of the motors 22 is three or more. For example, in a case where there are an even number of the motors 22, two of the motors 22 may make a pair, the above-described rotation speed evaluation may be performed for each pair, and the battery 24 may be moved in accordance with the evaluation result.

Figure 2:
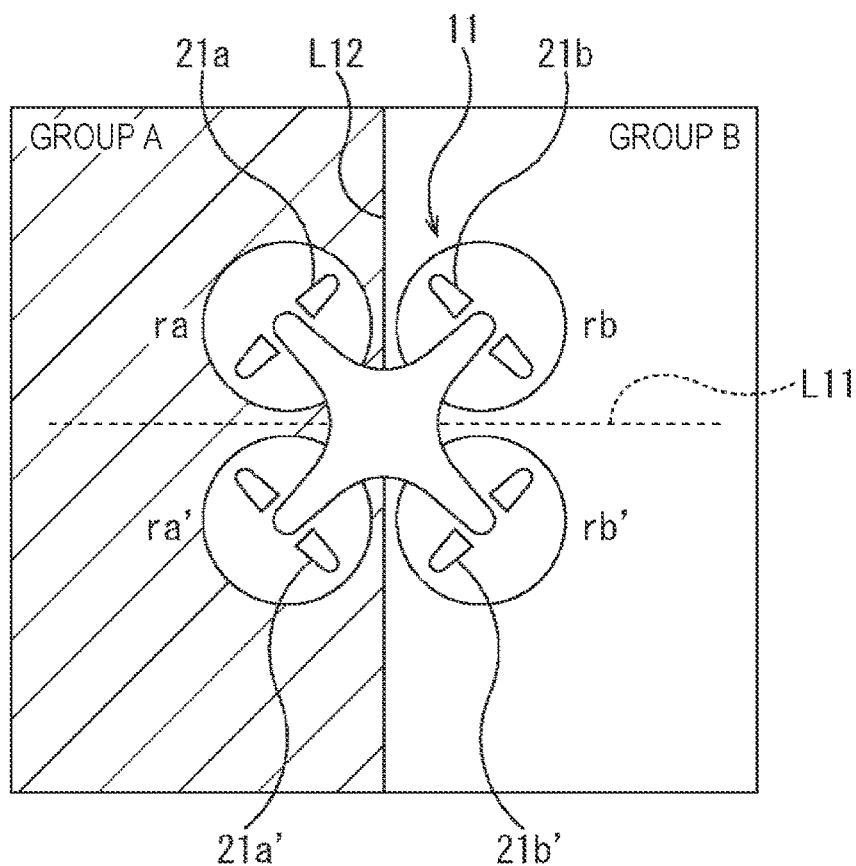
FIG. 2 is a diagram explaining adjustment of the position of the center of gravity.

Specifically, as shown in FIG. 2, for example, it is assumed that the unmanned aerial vehicle 11 is provided with four propellers and four motors that drive those propellers. It is to be noted that parts in FIG. 2 corresponding to those in FIG. 1 are given the same reference numerals, and description thereof will be omitted as appropriate. In addition, in FIG. 2, illustration of each motor is omitted.

In this example, the unmanned aerial vehicle 11 is provided with a propeller 21a' and a propeller 21b' in addition to the propeller 21a and the propeller 21b shown in FIG. 1.

Here, the propeller 21a and the propeller 21b are disposed side by side in the horizontal direction in the figure on the upper side in the figure, and the propeller 21a' and the propeller 21b' are disposed side by side in the horizontal direction below in the figure of the propeller 21a and the propeller 21b.

In addition, the propellers 21a and 21a' are disposed side by side in the vertical direction in the figure, and the propellers 21b and 21b' are disposed side by side in the vertical direction in the figure. In particular, in the unmanned aerial vehicle 11, the propeller 21a, the propeller 21b, the propeller 21a', and the propeller 21b' are disposed side by side in a two-dimensional plane.

Furthermore, in this example, the unmanned aerial vehicle 11 is provided with a motor 22a' and a motor 22b' that are not shown, which are rotation drive units that rotate the propellers 21a' and 21b', respectively.

It is to be noted that hereinafter, the propeller 21a, the propeller 21b, the propeller 21a', and the propeller 21b' will be referred to simply as the propeller 21 in a case where there is no particular need to distinguish them from one another. In addition hereinafter, the motor 22a, the motor 22b, the motor 22a', and the motor 22b' will be simply referred to as the motor 22 in a case where there is no particular need to distinguish them from one another.

Furthermore, hereinafter, the rotation speeds of the motor 22a' and the motor 22b' will be referred to as the rotation speeds ra' and rb', respectively.

In the example of FIG. 2, four motors 22 (propellers 21) are divided into two pairs.

Specifically, in the example shown in FIG. 2, for example, the battery 24 is linearly movable in the left-right direction in the figure. In FIG. 2, a straight line L11 represents a battery movable line (battery movable direction), which is a direction in which the battery 24 can move.

When a straight line L12 passing through the airframe center position and orthogonal to the battery movable line is a division line, the motor 22, i.e., the propeller 21, is divided into a group A and a group B by the division line.

Here, it is assumed that the motor 22a and the motor 22a' positioned on the left side in the figure with respect to the division line belong to the group A, and the motor 22b and the motor 22b' positioned on the right side in the figure with respect to the division line belong to the group B.

Then, the motor 22 belonging to the group A and the motor 22 of the group B present at a position symmetrical to the motor 22 with respect to the division line make a pair.

Therefore, here, the motor 22a and the motor 22b make a pair, and the motor 22a' and the motor 22b' make another pair.

Then, as for the pair of the motor 22a and the motor 22b, the difference (ra−rb) is compared with the threshold value |t| or the threshold value −|t|, similarly to the above example.

In addition, as for the pair of the motor 22a' and the motor 22b', similarly, the difference (ra'−rb') and the threshold value |t| or the threshold value −|t| are compared.

Then, the battery 24 is moved along the battery movable line until the difference (ra−rb) and the difference (ra'−rb') become greater than the threshold value −|t| and less than the threshold value |t|, and the movement of the battery 24 and the evaluation of the rotation speed are repeatedly performed.

It is to be noted that although it is explained that the battery 24 is moved to the A side or the B side in FIG. 1, the battery 24 is moved in a direction parallel to the battery movable line in the example of FIG. 2. In particular, the direction on the left side in the figure of the directions parallel to the battery movable line corresponds to the A side, and the direction on the right side in the figure of the directions parallel to the battery movable line corresponds to the B side.

In addition, although an example in which the battery 24 moves on the straight line has been described, the battery 24 may be moved to an arbitrary position on the two-dimensional plane on the basis of the evaluation of the rotation speed of each motor 22.

Furthermore, although an example in which one battery 24 is provided for four propellers 21 is described in FIG. 2, one battery may be provided as a center-of-gravity position adjustment member for each pair of propellers 21. Specifically, for example, in the example of FIG. 2, one battery is only required to move on a straight line connecting the propeller 21a and the propeller 21b' in accordance with the comparison result between the difference (ra−rb') and the threshold value, and the other one battery is only required to move on a straight line connecting the propeller 21a' and the propeller 21b in accordance with the comparison result between the difference (ra'−rb) and the threshold value.

<About Configuration of Battery Movable Part>

Next, a specific configuration example of the battery movable part 25 will be described.

Figure 3:
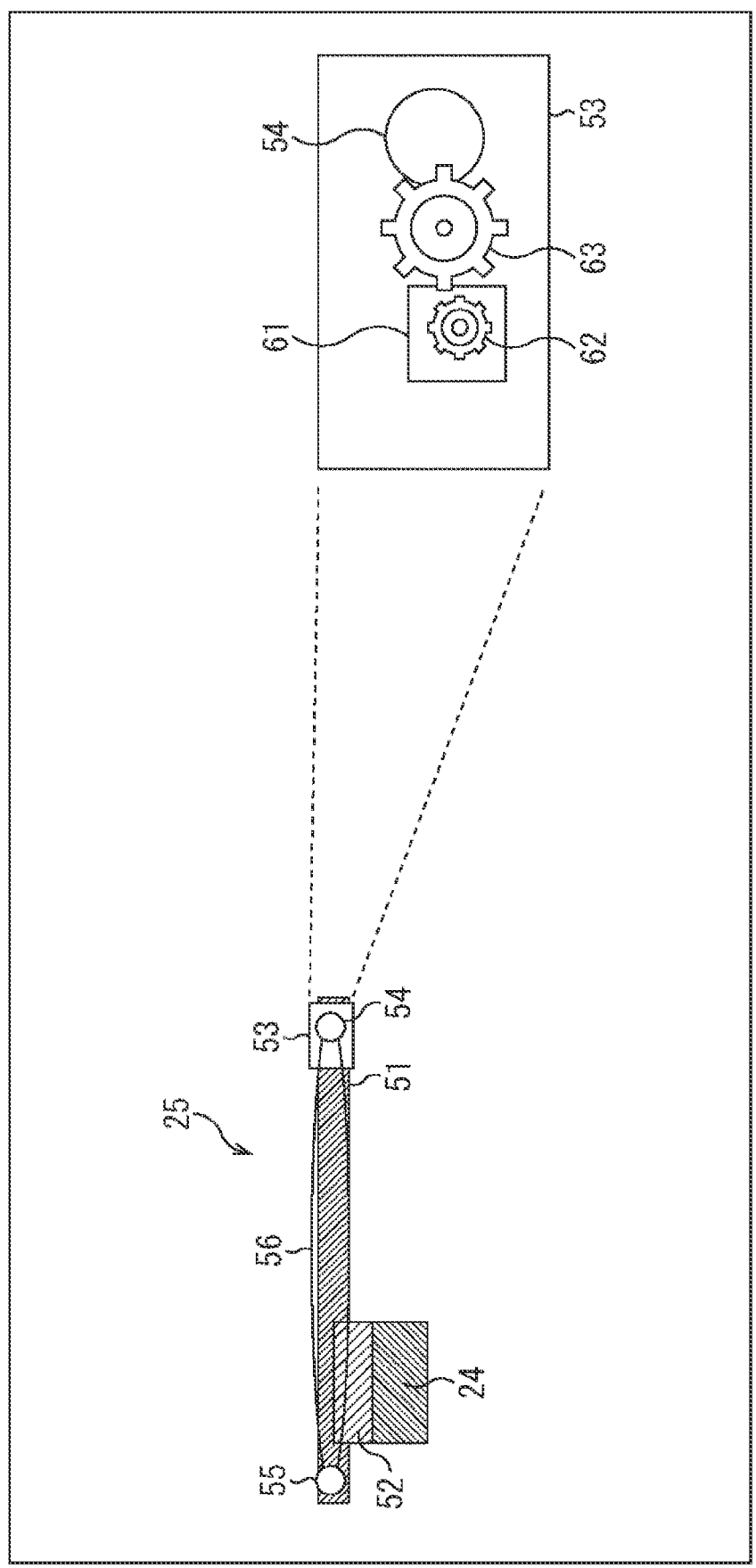
FIG. 3 is a diagram showing a configuration example of a battery movable part.

The battery movable part 25 can be configured as shown in FIG. 3, for example.

In the example shown in FIG. 3, the battery movable part 25 has a linear base rail 51, a battery holder 52 provided on the base rail 51, a gearbox 53, a pulley 54, a pulley 55, and a belt 56.

That is, the gearbox 53 and the pulley 54 are disposed at one end of the base rail 51, and the pulley 55 is provided at the other end of the base rail 51. Then, one belt 56 is provided at the parts of two pulleys 54 and 55 serving as rotation axes, and the battery holder 52 that holds the battery 24 is fixed to the belt 56.

In addition, a motor 61, a transmission gear 62, and a transmission gear 63 are provided inside the gearbox 53 as shown on the right side in the figure.

When the battery 24 is moved, the battery movable part 25 rotates the motor 61. When the rotation axis of the motor 61 rotates, the transmission gear 62 fixed to the rotation axis and the transmission gear 63 disposed so as to mesh with the transmission gear 62 rotate, whereby the pulley 54 meshing with the transmission gear 63 rotates.

Then, in response to the rotation of the pulley 54, the belt 56 rotates and the pulley 55 also rotates, and as a result, the battery holder 52 fixed to the belt 56 and the battery 24 held by the battery holder 52 linearly move along the base rail 51.

It is to be noted that although an example in which the battery movable part 25 mechanically moves the battery 24 by rotating the motor 61 has been described here, the mechanism in which the battery movable part 25 moves the battery 24 is not limited to the example in FIG. 3 and may be any kind. For example, a superconducting electromagnet may be used to move the battery 24 by magnetic force, or an actuator or the like may be used to move the battery 24.

Alternatively, for example, a rotor arm having the propeller 21 and the motor 22 fixed at its tip may have a certain weight, and the rotor arm may be used as a center-of-gravity position adjustment member. In such a case, the unmanned aerial vehicle 11 adjusts the position of the center of gravity by expanding and contracting the rotor arm. Alternatively, a battery or the like as a center-of-gravity position adjustment member may be fixed to the rotor arm, and the position of the center of gravity may be adjusted by expanding and contracting the rotor arm.

<Functional Configuration Example of Unmanned Aerial vehicle>

Next, a functional configuration example of the unmanned aerial vehicle 11 will be described.

Figure 4:
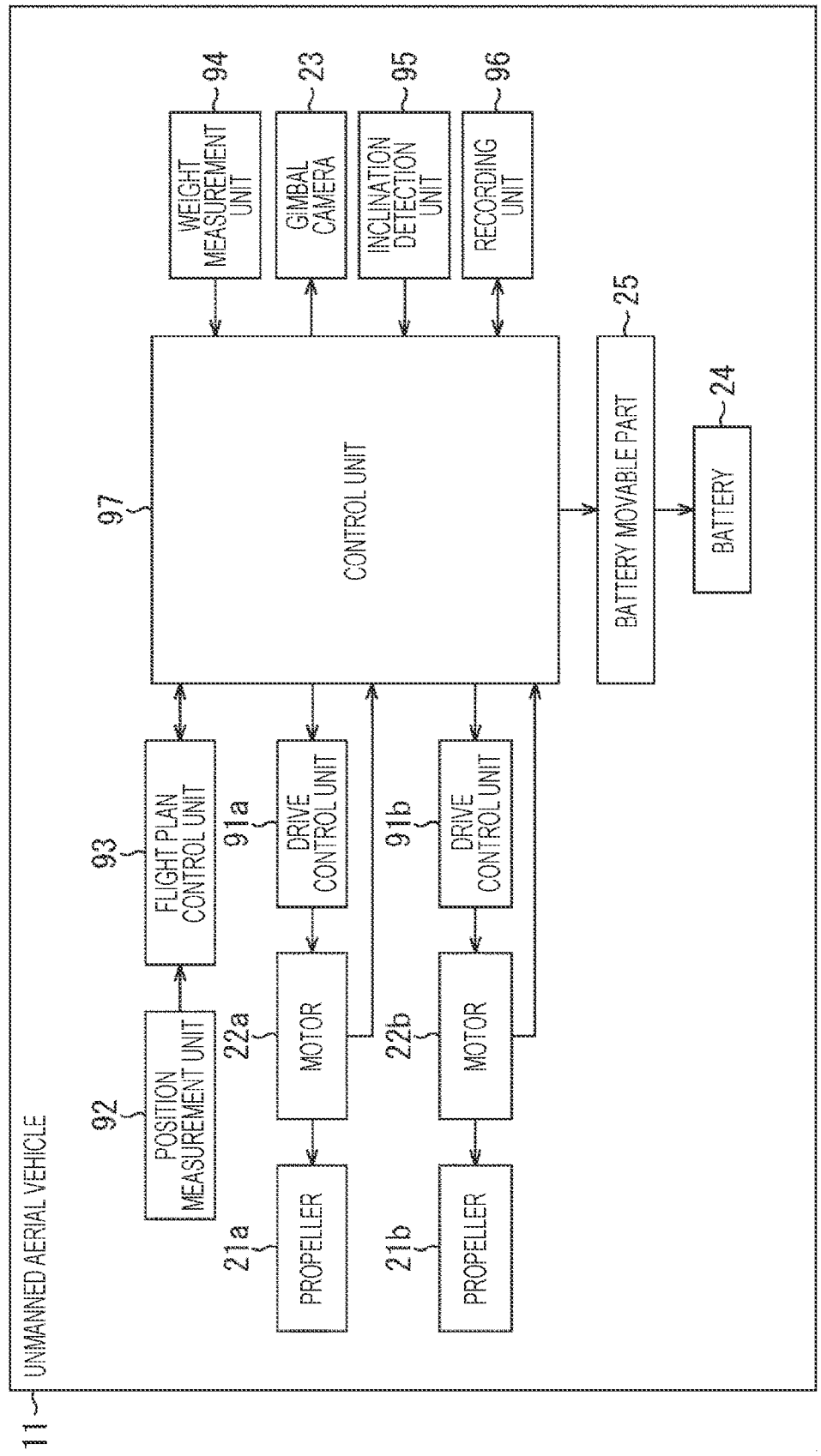
FIG. 4 is a diagram showing a functional configuration example of an unmanned aerial vehicle.

Here, the configuration of the unmanned aerial vehicle 11 having the two propellers 21 shown in FIG. 1 will be described. The functional configuration of such an unmanned aerial vehicle 11 is as shown in FIG. 4, for example. It is to be noted that parts in FIG. 4 corresponding to those in FIG. 1 are given the same reference numerals, and description thereof will be omitted as appropriate.

The unmanned aerial vehicle 11 shown in FIG. 4 has the propeller 21a, the propeller 21b, the motor 22a, the motor 22b, a drive control unit 91a, a drive control unit 91b, a position measurement unit 92, a flight plan control unit 93, a weight measurement unit 94, the gimbal camera 23, an inclination detection unit 95, a recording unit 96, the battery movable part 25, the battery 24, and a control unit 97.

The drive control unit 91a and the drive control unit 91b control the drive of the motor 22a and the motor 22b in accordance with an instruction from the control unit 97.

In addition, the motor 22a supplies its own rotation speed ra at the time of driving to the control unit 97, and similarly the motor 22b supplies its own rotation speed rb at the time of driving to the control unit 97. It is to be noted that the rotation speed of the motor 22 may be detected by the drive control unit 91, or may be detected by the control unit 97 or the like from an internal variable related to the drive of the motor 22.

Furthermore, for simplicity of explanation, an example in which the unmanned aerial vehicle 11 is provided with two propellers 21 is described. However, as shown in FIG. 2, the unmanned aerial vehicle 11 may be provided with four propellers 21.

In such a case, the unmanned aerial vehicle 11 is provided with the propeller 21a', the propeller 21b', the motor 22a', the motor 22b', and a drive control unit 91a' and a drive control unit 91b' that control the respective drives of the motor 22a' and the motor 22b'.

It is to be noted that hereinafter, the drive control unit 91a, the drive control unit 91b, the drive control unit 91a', and the drive control unit 91b' will be referred to simply as the drive control unit 91, in a case where there is no particular need to distinguish them from one another.

The position measurement unit 92, which includes, for example, a global positioning system (GPS), measures the position of the unmanned aerial vehicle 11 in the real space, and supplies the measurement result to the flight plan control unit 93.

The flight plan control unit 93 generates flight plan information indicating a flight plan of the unmanned aerial vehicle 11 on the basis of information supplied from the control unit 97 and the measurement result of the position supplied from the position measurement unit 92, and supplies the flight plan information to the control unit 97, while exchanging information with the control unit 97 as appropriate. Here, the flight plan information is information indicating a flight plan such as what route and at what speed the unmanned aerial vehicle 11 flies.

The weight measurement unit 94 measures the weight of the payload loaded on the unmanned aerial vehicle 11, such as the gimbal camera 23 loaded on the unmanned aerial vehicle 11, and supplies weight information obtained as a measurement result to the control unit 97. It is to be noted that an example in which the gimbal camera 23 is loaded as a payload will be described hereinafter, but the payload loaded on the unmanned aerial vehicle 11 is not limited to the gimbal camera 23, and may be any other thing. Two or more payloads may be loaded.

The weight information is information indicating an increase amount of the weight of the unmanned aerial vehicle 11 having increased by loading the payload (gimbal camera 23) with respect to the original weight of the unmanned aerial vehicle 11. That is, the weight information is information indicating an increase amount in weight with respect to a predetermined reference weight of the unmanned aerial vehicle 11.

The inclination detection unit 95, which includes, for example, a gyro sensor and a camera, detects an inclination of the unmanned aerial vehicle 11 from the horizontal state, i.e., an inclination of the airframe with respect to the ground, and supplies the detection result to the control unit 97.

For example, in a case where the inclination detection unit 95 includes a gyro sensor, an inclination angle or the like indicated by the output of the gyro sensor is output as a detection result of the inclination of the airframe. In addition, for example, in a case where the inclination detection unit 95 includes a camera, an inclination angle of the airframe with respect to the ground is detected by image recognition or the like from an image captured by the camera.

The recording unit 96, which includes, for example, a nonvolatile memory, records various types of information supplied from the control unit 97 and supplies recorded information to the control unit 97.

For example, center-of-gravity adjustment information used when the unmanned aerial vehicle 11 adjusts the position of the center of gravity of the airframe is recorded in the recording unit 96 as necessary.

For example, the center-of-gravity adjustment information includes weight information, battery position information, and rotation speed difference information. In other words, the recording unit 96 records the weight information, the battery position information, and the rotation speed difference information in association with one another. It is to be noted that although the description that the center-of-gravity adjustment information includes the rotation speed difference information has been given here, the center-of-gravity adjustment information may not include the rotation speed difference information.

Here, the battery position information is information indicating the position of the battery 24 in a balanced state of the unmanned aerial vehicle 11 at the time of a flight when the weight indicated by the weight information included in the same center-of-gravity adjustment information is measured. That is, the battery position information is information indicating the position of the battery 24 after the position of the center of gravity is adjusted by the movement of the battery 24. Specifically, the battery position information may be information indicating a movement direction and a movement amount of the battery 24.

In addition, the rotation speed difference information is information indicating the difference (ra−rb) between the rotation speed ra and the rotation speed rb in a state where the battery 24 is present at a position indicated by the battery position information included in the same center-of-gravity adjustment information and the unmanned aerial vehicle 11 is balanced at the time of a flight when the weight indicated by the weight information included in the same center-of-gravity adjustment information is measured.

Therefore, for example, in a case where a predetermined weight is measured by the weight measurement unit 94, if the center-of-gravity adjustment information including weight information indicating the weight is already recorded in the recording unit 96, the balance of the airframe can be easily achieved in the unmanned aerial vehicle 11. That is, the balance of the airframe should be achieved if the battery position information and the rotation speed difference information included in the center-of-gravity adjustment information are read out, the battery 24 is moved to the position indicated by the battery position information, and the rotation speed of each motor 22 is controlled so that the difference (ra−rb) becomes the difference indicated by the rotation speed difference information.

In the unmanned aerial vehicle 11, in a case where center-of-gravity adjustment information including weight information obtained by measurement is not recorded in the recording unit 96 as a result of weight measurement at the time of a flight, the center-of-gravity adjustment information including the weight information is newly generated and recorded in the recording unit 96.

In a case where the center-of-gravity adjustment information including the weight information obtained by the measurement is recorded in the recording unit 96 as a result of the weight measurement at the time of the flight but the balance of the airframe is not achieved even by using the center-of-gravity adjustment information, center-of-gravity adjustment information is newly generated and the center-of-gravity adjustment information in the recording unit 96 is updated.

The control unit 97 controls the overall operation of the unmanned aerial vehicle 11. For example, the control unit 97 controls the drive control unit 91 and the battery movable part 25 on the basis of the flight plan information supplied from the flight plan control unit 93 and the rotation speed supplied from the motor 22, and controls the flight of the unmanned aerial vehicle 11 and balances the airframe.

<Explanation of Flight Control Processing at First Takeoff>

Incidentally, in a case where the unmanned aerial vehicle 11 takes off for the first time after starting up, the unmanned aerial vehicle 11 performs flight control processing at the time of the first takeoff, which is processing for performing weight measurement and, as necessary, generating center-of-gravity adjustment information. The flight control processing at the time of the first takeoff to be performed by the unmanned aerial vehicle 11 shown in FIG. 4 will be described below with reference to the flowchart of FIG. 5.

At the time of takeoff of the unmanned aerial vehicle 11, the drive control unit 91 controls the drive of the motor 22 in accordance with an instruction from the control unit 97. By rotating in accordance with the control of the drive control unit 91, the motor 22 rotates the propeller 21 connected to the rotation axis of the motor 22 itself, thereby causing the unmanned aerial vehicle 11 to vertically take off.

When the unmanned aerial vehicle 11 takes off, the weight measurement unit 94 performs weight measurement in step S11, and supplies the resultant weight information to the control unit 97.

In step S12, the control unit 97 determines whether or not the center-of-gravity adjustment information including weight information indicating the same weight as the weight information supplied from the weight measurement unit 94 is recorded in the recording unit 96. In other words, it is determined whether or not the battery position information corresponding to the weight obtained by the measurement is recorded in the recording unit 96.

If it is determined in step S12 that the center-of-gravity adjustment information is not recorded, the processing of step S13 is not performed, and then the processing proceeds to step S14.

On the other hand, in a case where it is determined in step S12 that the center-of-gravity adjustment information is recorded, the control unit 97 reads out, from the recording unit 96, the center-of-gravity adjustment information including weight information indicating the same weight as the weight information supplied from the weight measurement unit 94, and thereafter the processing proceeds to step S13.

In step S13, the battery movable part 25 moves the battery 24.

That is, the control unit 97 instructs the battery movable part 25 to move the battery 24 so that the battery 24 moves to a position indicated by the battery position information included in the center-of-gravity adjustment information read out from the recording unit 96. Then, the battery movable part 25 moves the battery 24 in response to the instruction of the control unit 97.

At the same time, the control unit 97 instructs the drive control unit 91 to drive and control the motor 22 so that the difference (ra−rb) in the rotation speed of the motor 22 becomes the difference indicated by the rotation speed difference information included in the center-of-gravity adjustment information, on the basis of the center-of-gravity adjustment information and the rotation speed supplied from the motor 22.

Then, in response to the instruction from the control unit 97, the drive control unit 91 controls the rotational drive of the motor 22 so that the rotation speed of the motor 22 becomes an appropriate rotation speed corresponding to the difference (ra−rb) on which an instruction is given.

If the position of the battery 24 and the rotation speed of the motor 22 are adjusted on the basis of the center-of-gravity adjustment information in this manner, the airframe of the unmanned aerial vehicle 11 should basically be brought into a balanced state.

After the processing of step S13 is performed, the processing proceeds to step S14.

If the processing of step S13 is performed or it is determined in step S12 that the center-of-gravity adjustment information is not recorded, the processing of step S14 is performed.

In step S14, the control unit 97 controls the rotation of the motor 22 so that the airframe of the unmanned aerial vehicle 11 becomes horizontal, i.e., is brought into a balanced state, on the basis of the detection result of the inclination of the airframe supplied from the inclination detection unit 95. That is, the control unit 97 instructs the drive control unit 91 to control the rotational drive of the motor 22.

Then, each drive control unit 91 controls the rotational drive of the motor 22 so as to appropriately increase or decrease the rotation speed of the motor 22 in response to an instruction from the control unit 97. Thus, the airframe of the unmanned aerial vehicle 11 is brought into a balanced state.

In step S15, the control unit 97 determines whether or not the difference (ra−rb) between the rotation speed ra and the rotation speed rb is equal to or greater than the threshold value |t|, i.e., whether or not ra−rb≥|t| is true, on the basis of the rotation speed supplied from the motor 22

In a case where it is determined in step S15 that ra−rb≥|t| is true, i.e., in a case where the center of gravity of the airframe of the unmanned aerial vehicle 11 is inclined to the A side, the control unit 97 determines in step S16 whether or not the battery 24 can be moved to the B side.

For example, in step S16, in a case where the current position of the battery 24 is not the position of the B side end, it is determined that the battery can be moved to the B side.

In a case where it is determined in step S16 that the battery 24 cannot be moved to the B side, the battery 24 is already present at the position of the B side end although the center of gravity of the airframe is not at the airframe center position, and the battery 24 cannot be moved on to the B side any more, and hence the processing proceeds to step S21.

In this case, the difference (ra−rb) is so large that the rotation speeds of each motor 22 deviates, but the deviation in the rotation speed cannot be reduced any more by position adjustment of the battery 24.

On the other hand, in a case where it is determined in step S16 that the battery can move to the B side, the control unit 97 instructs the battery movable part 25 to move the battery 24 to the B side, and thereafter the processing proceeds to step S17. That is, the control unit 97 controls the movement of the battery 24 to the B side by the battery movable part 25.

In step S17, in response to an instruction from the control unit 97, the battery movable part 25 moves the battery 24 to the B side by a predetermined unit change amount (distance) while maintaining the positional relationship between the propeller 21 or the motor 22 and the airframe.

After the battery 24 is moved to the B side, the processing returns to step S14, and the above-described processing is repeated.

In this case in particular, as the battery 24 is moved to the B side, the center of gravity of the airframe is adjusted to a position closer to the airframe center position, but the balance of the airframe is lost, and hence the rotation speed of the motor 22 is adjusted in step S14 so that the airframe becomes horizontal.

In addition, in a case where it is determined in step S15 that ra−rb≥|t| is not true, i.e., in a case where the difference (ra−rb) is less than the threshold value |t|, the processing proceeds to step S18.

In step S18, the control unit 97 determines whether or not the difference (ra−rb) between the rotation speed ra and the rotation speed rb is equal to or less than the threshold value −|t|, i.e., whether or not ra−rb≤−|t| is true, on the basis of the rotation speed supplied from the motor 22.

In a case where it is determined in step S18 that ra−rb≤−|t| is true, i.e., in a case where the center of gravity of the airframe of the unmanned aerial vehicle 11 is inclined to the B side, the control unit 97 determines in step S19 whether or not the battery 24 can be moved to the A side.

For example, in step S19, in a case where the current position of the battery 24 is not the position of the A side end, it is determined that the battery can be moved to the A side.

In a case where it is determined in step S19 that the battery 24 cannot be moved to the A side, the battery 24 is already present at the position of the A side end although the center of gravity of the airframe is not at the airframe center position, and the battery 24 cannot be moved on to the A side any more, and hence the processing proceeds to step S21.

On the other hand, in a case where it is determined in step S19 that the battery can move to the A side, the control unit 97 instructs the battery movable part 25 to move the battery 24 to the A side, and thereafter the processing proceeds to step S20. That is, the control unit 97 controls the movement of the battery 24 to the A side by the battery movable part 25.

In step S20, in response to an instruction from the control unit 97, the battery movable part 25 moves the battery 24 to the A side by a predetermined unit change amount (distance) while maintaining the positional relationship between the propeller 21 or the motor 22 and the airframe.

After the battery 24 is moved to the A side, the processing returns to step S14, and the above-described processing is repeated.

In this case in particular, as the battery 24 is moved to the A side, the center of gravity of the airframe is adjusted to a position closer to the airframe center position, but the balance of the airframe is lost, and hence the rotation speed of the motor 22 is adjusted in step S14 so that the airframe becomes horizontal.

On the other hand, in a case where it is determined in step S18 that ra−rb≤−|t| is not true, the processing proceeds to step S21 thereafter.

In this case, the difference (ra−rb) is greater than the threshold value −|t| and less than the threshold value |t|. That is, the airframe is balanced, and the difference (ra−rb) is so sufficiently small that there is no deviation in the rotation speed of each motor 22. In this state, the position of the center of gravity of the airframe is at the airframe center position.

The processing of step S21 is performed if it is determined in step S16 that the battery cannot be moved to the B side, if it is determined in step S18 that ra−rb≤−|t| is not true, or if it is determined in step S19 that the battery cannot be moved to the A side.

In step S21, the control unit 97 generates the center-of-gravity adjustment information.

Specifically, the control unit 97 generates center-of-gravity adjustment information including the weight information obtained in step S11, battery position information indicating the current position of the battery 24, i.e., the position of the battery 24 after movement, and the rotation speed difference information indicating the difference (ra−rb) of the rotation speed of the motor 22 at the present time.

In step S22, the control unit 97 supplies the center-of-gravity adjustment information generated in step S21 to the recording unit 96 and causes the recording unit 96 to record the center-of-gravity adjustment information, and the flight control processing at the time of the first takeoff ends.

It is to be noted that in step S22, in a case where the same center-of-gravity adjustment information as that generated in step S21 has already been recorded in the recording unit 96, recording of the center-of-gravity adjustment information is not performed. In addition, in a case where center-of-gravity adjustment information that is different from one generated in step S21 but has the same weight information is recorded in the recording unit 96, the center-of-gravity adjustment information is rewritten to the center-of-gravity adjustment information generated in step S21, and the center-of-gravity adjustment information is updated.

In the above manner, the unmanned aerial vehicle 11 moves the battery 24 on the basis of the difference (ra−rb) of the rotation speed of the motor 22, thereby adjusting the position of the center of gravity of the airframe. By thus adjusting the position of the center of gravity, it is possible to easily balance an airframe.

Moreover, even if the weight of the payload such as the gimbal camera 23 mounted on the unmanned aerial vehicle 11 changes, the position of the center of gravity of the airframe can be easily adjusted only by moving the battery 24. In addition, since the position of the center of gravity of the airframe is fixed at a position as close to the airframe center position as possible, i.e., a position where the difference in the rotation speed of the motors 22 is minimized, variations in deterioration of the motors 22 can be minimized.

It is to be noted that the threshold value |t| and the threshold value −|t| compared with the difference (ra−rb) in step S15 and step S18 may be predetermined values or may be determined by the control unit 97 on the basis of the weight information obtained in step S11.

In addition, the movement amount of the battery 24 in step S17 or step S20, i.e., a predetermined unit change amount, may be determined on the basis of the weight information obtained in step S11, or the processing in and after step S14 may be performed after the battery 24 is moved in a predetermined direction by a distance determined with respect to the weight information.

Second Embodiment

<About Strong Wind Countermeasures>
Incidentally, if there is a strong wind during flight of the unmanned aerial vehicle 11, the unmanned aerial vehicle 11 may be blown. Therefore, in a case where a strong wind is predicted, the unmanned aerial vehicle 11 may be suppressed from being blown and inclined, by moving the center-of-gravity position adjustment member to increase the moment of inertia.

Figure 6:
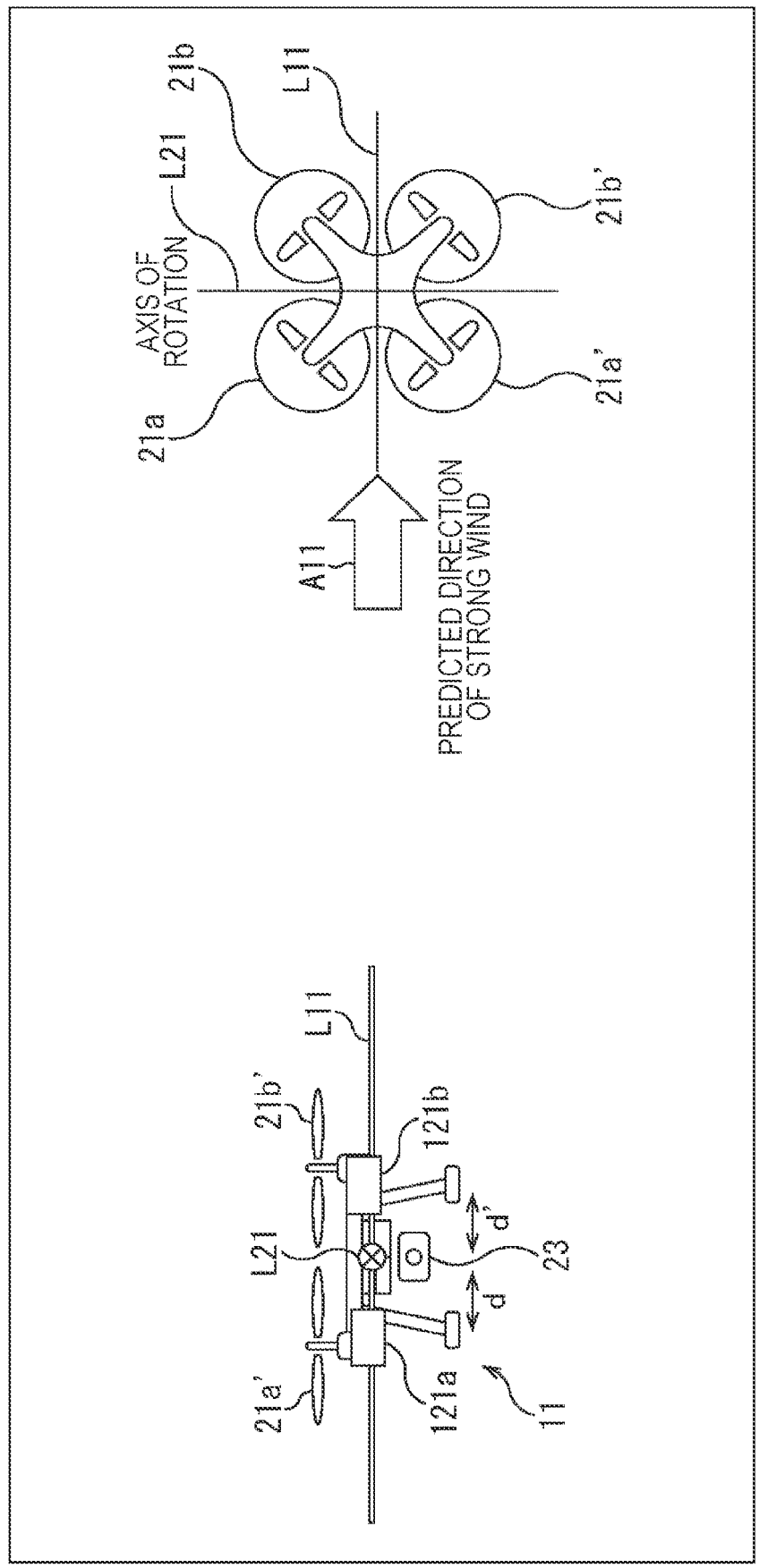
FIG. 6 is a diagram explaining strong wind countermeasures.

Specifically, it is assumed that four propellers 21 are provided in the unmanned aerial vehicle 11 as shown on the left side in FIG. 6, for example. It is to be noted that parts in FIG. 6 corresponding to those in FIG. 1 or 2 are given the same reference numerals, and description thereof will be omitted as appropriate.

In the example shown in FIG. 6, the unmanned aerial vehicle 11 is provided with a battery 121a and a battery 121b that are movable along the battery movable line indicated by the straight line L11.

Here, the battery 121a is movable from the airframe center position to an arbitrary position in the left direction in the figure, and the battery 121b is movable from the airframe center position to an arbitrary position in the right direction in the figure.

That is, each of the batteries 121a and 121b is movable in two directions different from each other and away from the airframe center position so that the moment of inertia increases without changing the position of the center of gravity of the airframe. The batteries 121a and 121b can move without changing the positional relationship between the propeller 21 or the motor 22 and the airframe.

Hereinafter, the distance from the airframe center position to the position of the battery 121a is referred also to as a distance d, and the distance from the airframe center position to the position of the battery 121b is referred also to as a distance d'. In addition hereinafter, the battery 121a and the battery 121b are referred simply to as the battery 121 in a case where there is no particular need to distinguish them from each other.

These two batteries 121 function as the center-of-gravity position adjustment member described above and also as the adjustment member for adjusting the moment of inertia, and the adjustment member for adjusting the moment of inertia and the center-of-gravity position adjustment member may be different.

For example, in a case where a strong wind is expected to blow toward the unmanned aerial vehicle 11, a straight line orthogonal to the direction in which the strong wind blows, the straight line passing through the airframe center position and parallel to the ground, is considered to be the rotation axis with respect to the inclination of the airframe. In the example of FIG. 6, assuming that a strong wind comes from the direction indicated by an arrow A11 as shown on the right side in the figure, a straight line L21 orthogonal to the arrow A11 becomes the rotation axis.

Therefore, in the unmanned aerial vehicle 11, the airframe can be less likely to incline due to a strong wind by increasing the moment of inertia of the airframe with respect to the rotation axis.

For example, for simplicity of explanation, the position of the center of gravity of the unmanned aerial vehicle 11 is assumed to be always at the airframe center position. At this time, it is assumed that the two batteries 121 are present at positions where the distance d=d'=d1 is satisfied in order to balance the airframe in a normal state free from strong wind (hereinafter also referred to as a normal state). Here, the position where the distance d=d'=d1 is satisfied is the position closest to the airframe center position, for example, and the position of such battery 121 will be referred to as the normal position hereinafter.

It is to be noted that in a case where the position of the center of gravity of the unmanned aerial vehicle 11 is not at the airframe center position, the position of the center of gravity of the unmanned aerial vehicle is only required to be at the airframe center position by moving either one of the battery 121a and the battery 121b from the normal position in a direction away from the airframe center position.

It is assumed that in a state where the battery 121 is in the normal position, a strong wind is predicted to come from the direction indicated by the arrow A11, for example.

In this case, the unmanned aerial vehicle 11 adjusts the orientation of the airframe so that the direction of the strong wind indicated by the arrow A11 and the direction of the battery movable line are parallel as shown on the right side in the figure, and then moves the battery 121 so that the distance d=d'=d2 (where d2>d1) is established.

That is, the unmanned aerial vehicle 11 moves the position of the battery 121 in a direction away from the airframe center position from the normal position so that the distance d=d' increases.

It is to be noted that the position of the battery 121 where the distance d=d'=d2 is true will hereinafter be referred to as a strong wind countermeasure position.

By thus changing the orientation of the airframe so that the strong wind direction and the battery movable line are parallel to each other and moving the position of the battery 121 from the normal position to the strong wind countermeasure position, the moment of inertia of the airframe with respect to the rotation axis shown by the straight line L21 becomes larger. This can suppress the airframe of the unmanned aerial vehicle 11 from rotating due to a strong wind, and easily balance the airframe.

In addition, the mechanism that moves the battery 121 to the strong wind countermeasure position or the like may be any mechanism in addition to the mechanism described with reference to FIG. 3, for example.

For example, the magnitude of the moment of inertia may be adjusted by fixing some batteries 121 to a circular telescopic pipe capable of freely changing the radius (diameter) and adjusting the radius by expanding and contracting the telescopic pipe.

In this case, for example, the state in which the telescopic pipe is most contracted is the state in which the battery 121 is in the normal position, and conversely, the state in which the telescopic pipe is most extended is the state in which the battery 121 is in the strong wind countermeasure position.

<Functional Configuration Example of Unmanned Aerial Vehicle>

Figure 7:
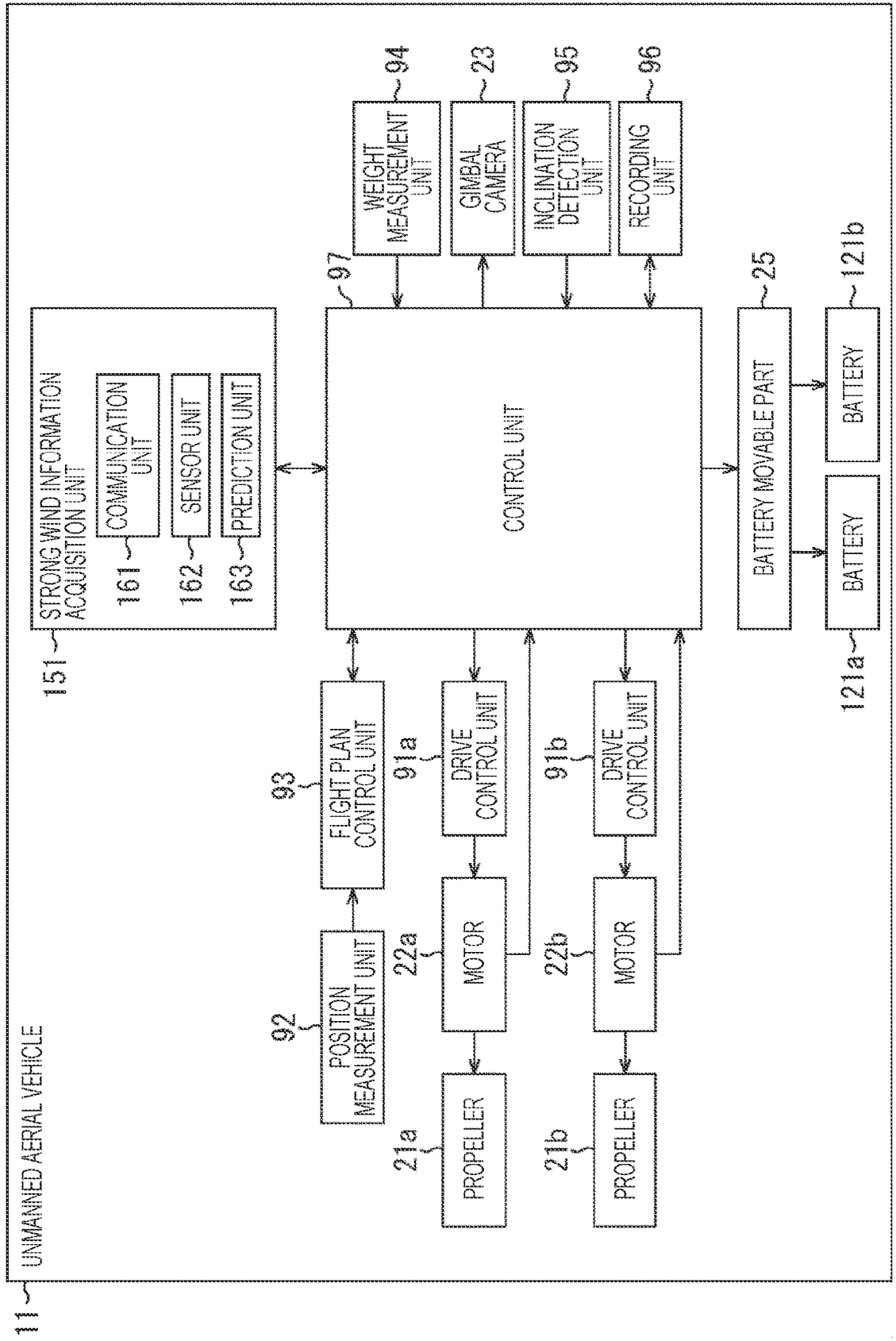
FIG. 7 is a diagram showing a functional configuration example of an unmanned aerial vehicle.

In a case where the strong wind countermeasures are taken as described above, the functional configuration of the unmanned aerial vehicle 11 is as shown in FIG. 7, for example.

It is to be noted that parts in FIG. 7 corresponding to those in FIG. 4 or 6 are given the same reference numerals, and description thereof will be omitted as appropriate. In addition, similarly to the case in FIG. 4, the unmanned aerial vehicle 11 shown in FIG. 7 is also not provided with the propeller 21a', the propeller 21b', the motor 22a', the motor 22b', the drive control unit 91a', and the drive control unit 91b', but those blocks may be provided.

The unmanned aerial vehicle 11 shown in FIG. 7 has the propeller 21a, the propeller 21b, the motor 22a, the motor 22b, the drive control unit 91a, the drive control unit 91b, the position measurement unit 92, the flight plan control unit 93, the weight measurement unit 94, the gimbal camera 23, the inclination detection unit 95, the recording unit 96, the battery movable part 25, the battery 121a, the battery 121b, a strong wind information acquisition unit 151, and the control unit 97.

The configuration of the unmanned aerial vehicle 11 shown in FIG. 7 is different from the configuration of the unmanned aerial vehicle 11 shown in FIG. 4 in a respect that the battery 121 is provided instead of the battery 24 and the strong wind information acquisition unit 151 is newly provided, and the configuration of the unmanned aerial vehicle 11 shown in FIG. 7 is the same as the configuration of the unmanned aerial vehicle 11 shown in FIG. 4 in other respects.

In the unmanned aerial vehicle 11 shown in FIG. 7, the battery 121a and the battery 121b supply electric power to each unit of the unmanned aerial vehicle 11, and these batteries 121 function both as an adjustment member for adjusting the moment of inertia and as a center-of-gravity position adjustment member.

In addition, the battery movable part 25 has a mechanism capable of moving the battery 121a and the battery 121b independently, i.e., individually, and moves the battery 121 in accordance with an instruction from the control unit 97.

The strong wind information acquisition unit 151 acquires, as weather prediction information, strong wind prediction information indicating prediction of the wind direction (direction of wind) and the strength (wind force) at a predetermined time at a predetermined position in a space, and supplies the information to the control unit 97. The strong wind information acquisition unit 151 has a communication unit 161, a sensor unit 162, and a prediction unit 163.

Here, the strong wind prediction information includes wind force vector information, prediction position information, and prediction time information.

The wind force vector information is information indicating predicted wind strength (wind force) and its wind direction, and is, for example, vector information including an element x indicating wind force in the x direction, an element y indicating wind force in the y direction, and an element z indicating wind force in the z direction, in an xyz orthogonal coordinate system.

The prediction position information is information indicating a position (hereinafter also referred to as a prediction position) where a wind having the wind force and direction indicated by the wind force vector information is predicted to occur. The prediction position indicated by the prediction position information is expressed by, for example, latitude, longitude, and altitude.

The prediction time information is information indicating time (hereinafter also referred to as prediction time) at which a wind having the wind force and direction indicated by the wind force vector information is predicted to occur at the prediction position indicated by the prediction position information.

Therefore, the wind force vector information is information indicating the direction and force of the wind predicted to be observed at the predicted time at the predicted position, i.e., predicted to occur.

The communication unit 161 of the strong wind information acquisition unit 151 acquires strong wind prediction information including such wind force vector information, prediction position information, and prediction time information from an external server or the like.

That is, for example, the communication unit 161 acquires the measurement result of the position of the unmanned aerial vehicle 11 obtained by the position measurement unit 92 from the flight plan control unit 93 via the control unit 97 or directly from the flight plan control unit 93, and transmits the measurement result to the server via a wireless or wired communication network.

It is assumed here that the information indicating the position of the unmanned aerial vehicle 11 is also information expressed by latitude, longitude, and altitude similarly to the prediction position information.

When the information indicating the position of the unmanned aerial vehicle 11 obtained as the measurement result by the position measurement unit 92 is transmitted to the server in this manner, the server transmits, in response to the transmission of the information indicating the position of the unmanned aerial vehicle 11, strong wind prediction information indicating the position indicated by the information as the prediction position.

By receiving the strong wind prediction information transmitted from the server, the communication unit 161 can acquire strong wind prediction information indicating the wind direction and the wind force at each time at the position of the unmanned aerial vehicle 11. The communication unit 161 supplies, to the control unit 97, the strong wind prediction information acquired from the external server in this manner.

In addition, since the strong wind information acquisition unit 151 is provided with the sensor unit 162 and the prediction unit 163, the strong wind information acquisition unit 151 can perform prediction to generate strong wind prediction information.

For example, the sensor unit 162 includes a wind force sensor and a gyro sensor, and the prediction unit 163 predicts the wind direction and the wind force at several latest prediction times on the basis of the output of the sensor unit 162 and generates strong wind prediction information.

As a specific example, a case where a wind force sensor is used as the sensor unit 162 will be described, for example. In this case, for example, wind force sensors are attached toward different directions at a plurality of positions of the unmanned aerial vehicle 11 different from one another, and those wind force sensors measure the wind force of the wind blowing from each direction toward the unmanned aerial vehicle 11.

Therefore, wind information indicating the wind direction and the strength (wind force) of the wind at a predetermined time can be obtained from the output of each wind force sensor. Data including the wind force information at each time become time-series data indicating the observation result of the wind at the position of the unmanned aerial vehicle 11 in the space.

In addition, in this case, the prediction unit 163 has a predictor obtained in advance by learning. This predictor is a predictor that predicts the wind direction and the wind force in a future time on the basis of a temporal variation pattern of wind force information. That is, the predictor takes, as input, the wind force information at several different times, i.e., time-series data of wind force information, and outputs wind force vector information at several times in the future.

Therefore, the prediction unit 163 inputs, to the predictor, the time-series data of the wind force information obtained from the output of the sensor unit 162, and performs arithmetic processing. Then, the prediction unit 163 generates strong wind prediction information including wind force vector information, prediction position information, and prediction time information on the basis of the wind force vector information at each time obtained as a result of the arithmetic processing by the predictor and the measurement result of the position of the unmanned aerial vehicle 11 obtained from the flight plan control unit 93, and the prediction unit 163 supplies the strong wind prediction information to the control unit 97.

Furthermore, strong wind prediction information may be generated by, for example, a gyro sensor or the like as the sensor unit 162 detecting the acceleration at each time of the unmanned aerial vehicle 11 and the blown direction, i.e., the inclination direction (inclination).

In such a case, the prediction unit 163 has a predictor obtained in advance by learning. This predictor is a predictor that predicts the wind direction and the wind force at a future time on the basis of the temporal variation pattern of the acceleration and the inclination direction of the unmanned aerial vehicle 11. That is, this predictor takes, as input, the acceleration and inclination direction of the unmanned aerial vehicle 11 at several different times, and outputs wind force vector information at several times in the future.

Therefore, the prediction unit 163 inputs, to the predictor, the time-series data of the acceleration and the inclination direction of the unmanned aerial vehicle 11 supplied from the sensor unit 162, and performs arithmetic processing. Then, the prediction unit 163 generates strong wind prediction information including wind force vector information, prediction position information, and prediction time information on the basis of the wind force vector information at each time obtained as a result of the arithmetic processing by the predictor and the measurement result of the position of the unmanned aerial vehicle 11 obtained from the flight plan control unit 93, and the prediction unit 163 supplies the strong wind prediction information to the control unit 97.

Other than that, for example, the predictor included in the prediction unit 163 may take, as input, the time-series data of the wind force information and the time-series data of the acceleration and the inclination direction of the unmanned aerial vehicle 11, and output wind force vector information at several times.

By receiving the supply of strong wind prediction information from the strong wind information acquisition unit 151, the control unit 97 can grasp whether a strong wind will occur at a future time or whether the strong wind will calm down (wind will fail) on the basis of the strong wind prediction information, and can take the strong wind countermeasures described above.

<Explanation of Strong Wind Countermeasure Control Processing>

Next, the operation of the unmanned aerial vehicle 11 shown in FIG. 7 will be described.

Figure 5:
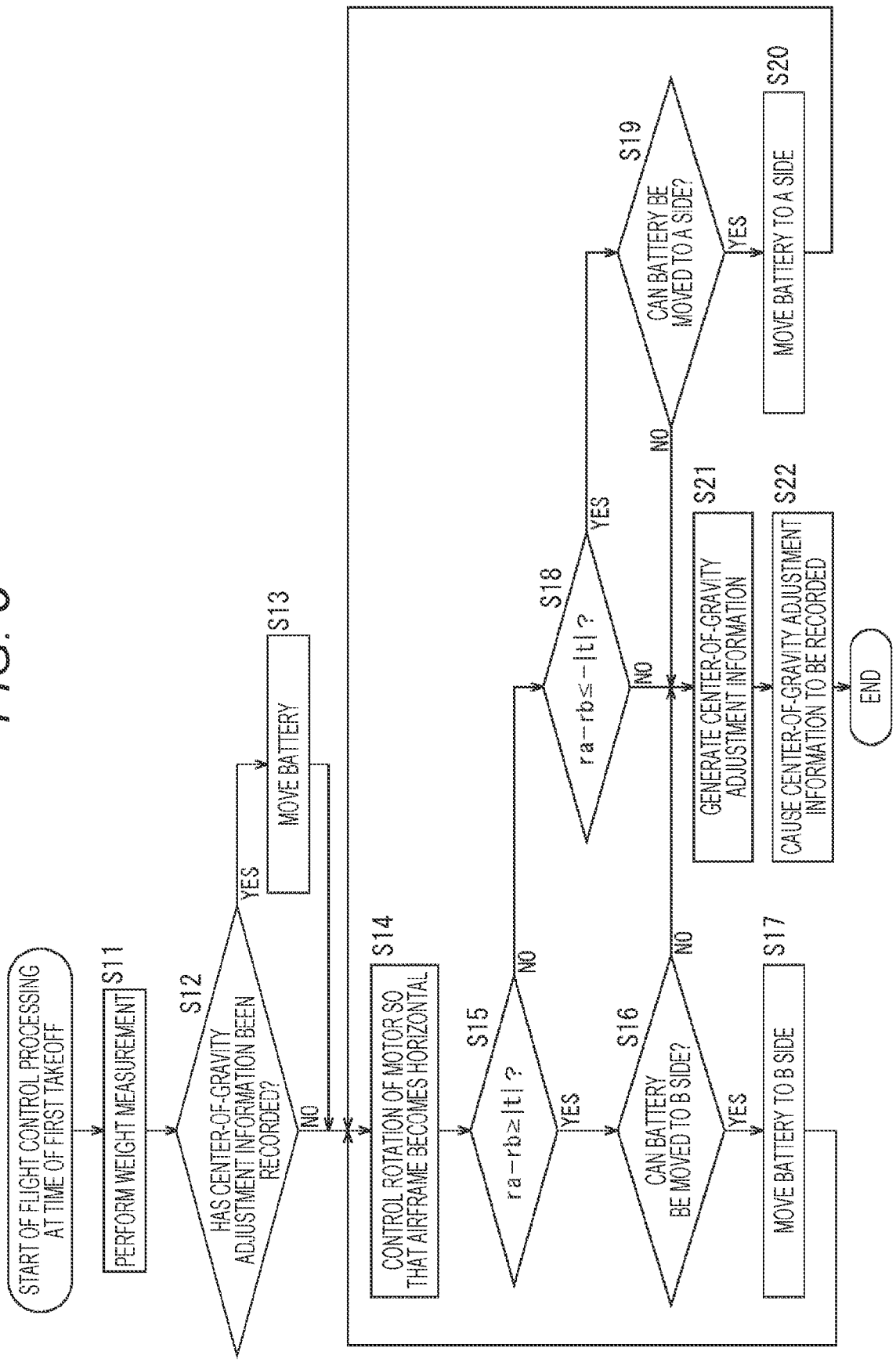
FIG. 5 is a flowchart explaining flight control processing at the time of first takeoff.

The unmanned aerial vehicle 11 adjusts the position of the center of gravity of the airframe by performing processing similar to the flight control processing at the first takeoff described with reference to FIG. 5, for example. At this time, on the basis of the difference in the rotation speed of the motor 22, the unmanned aerial vehicle 11 moves either the battery 121a or the battery 121b so that the center of gravity of the airframe is at the airframe center position.

Figure 8:
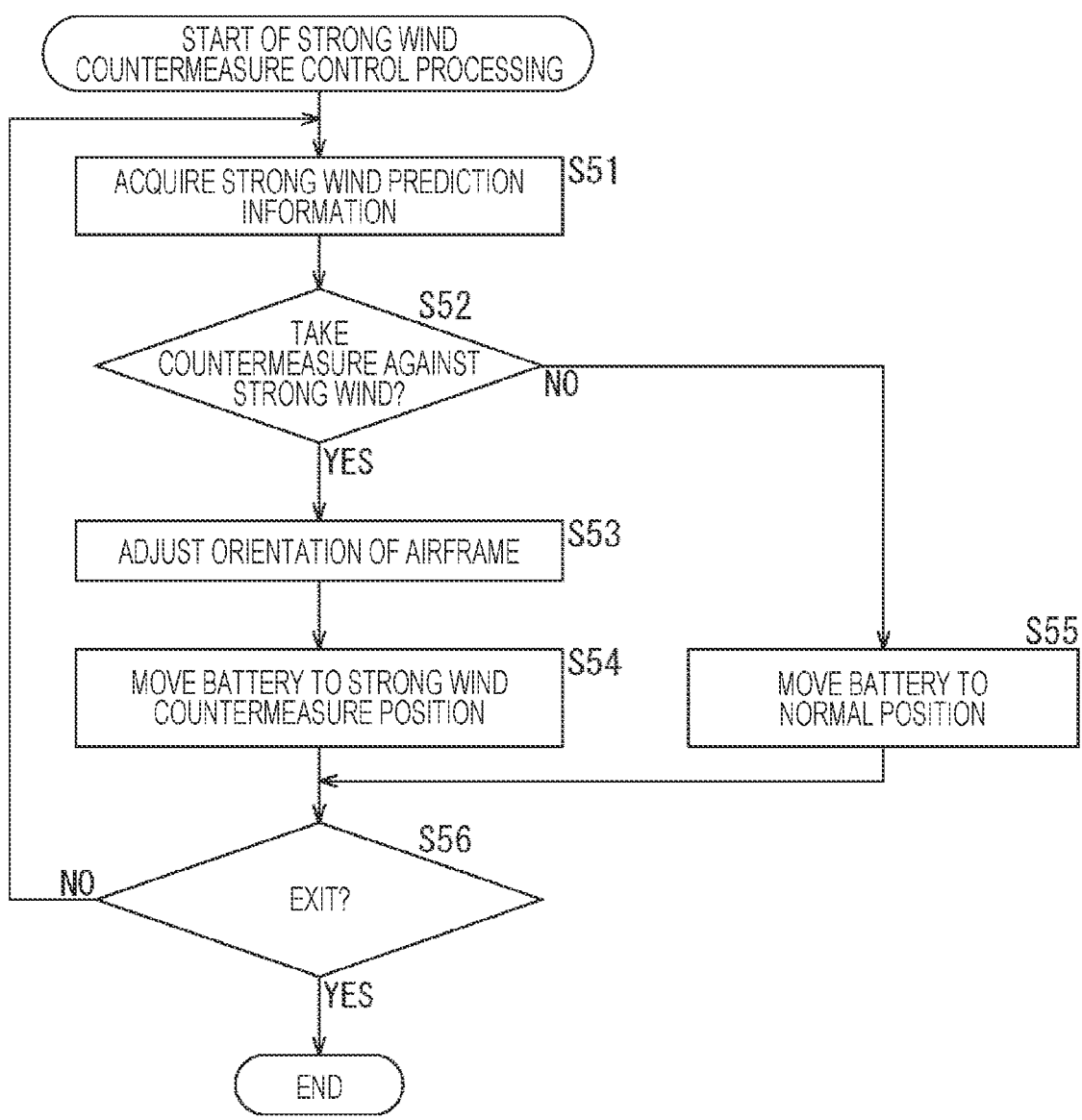
FIG. 8 is a flowchart explaining strong wind countermeasure control processing.

In addition, when the unmanned aerial vehicle 11 takes off, the unmanned aerial vehicle 11 adjusts the position of the center of gravity of the airframe and also executes the strong wind countermeasure control processing that takes strong wind countermeasures as necessary. Hereinafter, the strong wind countermeasure control processing performed by the unmanned aerial vehicle 11 will be described with reference to the flowchart of FIG. 8.

In step S51, the strong wind information acquisition unit 151 acquires strong wind prediction information.

Specifically, the communication unit 161 transmits, to the server, the measurement result of the position of the unmanned aerial vehicle 11 by the position measurement unit 92 obtained from the flight plan control unit 93, and receives the strong wind prediction information transmitted from the server in response thereto. The communication unit 161 supplies, to the control unit 97, the thus received strong wind prediction information.

It is to be noted that the strong wind prediction information may be generated by the strong wind information acquisition unit 151, instead of acquiring the strong wind prediction information as described above. In such a case, for example, the prediction unit 163 obtains wind force vector information by performing arithmetic processing by the predictor on the basis of the output of the sensor unit 162, and generates strong wind prediction information on the basis of the obtained wind force vector information and the measurement result by the position measurement unit 92.

In step S52, the control unit 97 determines whether or not to take strong wind countermeasures on the basis of the strong wind prediction information supplied from the strong wind information acquisition unit 151, i.e., the communication unit 161.

For example, since strong wind prediction information at each time in a predetermined period in the future direction can be obtained, it is determined that strong wind countermeasures are taken in a case where a strong wind is predicted to occur, i.e., strong wind is predicted to be observed in a predetermined period in the future direction from the strong wind prediction information.

As a specific example, it is determined in step S52 that strong wind countermeasures are taken in a case where there is even one piece of wind force vector information in which the wind force becomes equal to or greater than a predetermined threshold value in the wind force vector information included in the strong wind prediction information at each time in the predetermined period in the future direction.

In a case where it is determined in step S52 that strong wind countermeasures are to be taken, the processing proceeds to step S53.

In step S53, the control unit 97 adjusts the orientation of the airframe so that the movable direction of the battery 121, i.e., the above-mentioned battery movable line, is oriented in a direction parallel to the wind direction indicated by the wind force vector information at the time of strong wind.

Here, the wind direction indicated by the wind force vector information at the time of strong wind is the wind direction indicated by the wind force vector information at the time when the predicted time is closest to the current time, for example, of the wind force vector information in which the wind force becomes a predetermined threshold value or more.

Other than that, for example, the average value of the wind direction indicated by one or a plurality of pieces of wind force vector information in which the wind force becomes equal to or greater than a predetermined threshold value may be set to the wind direction indicated by the wind force vector information at the time of strong wind.

For example, the control unit 97 instructs the drive control unit 91 to control the rotational drive of the motor 22 so that the battery movable line is in a direction parallel to the wind direction.

Then, each drive control unit 91 controls the rotational drive of the motor 22 so as to appropriately increase or decrease the rotation speed of the motor 22 in response to an instruction from the control unit 97. Thus, the orientation of the airframe of the unmanned aerial vehicle 11 is changed so that the battery movable line becomes parallel to the wind direction.

It is to be noted that in step S53, the orientation of the gimbal camera 23 may be adjusted in accordance with the adjustment of the orientation of the airframe of the unmanned aerial vehicle 11. In such a case, for example, the control unit 97 controls the rotation mechanism of the gimbal camera 23 so that the gimbal camera 23 rotates by the same angle as the rotation angle of the airframe in the direction opposite to the rotation direction of the airframe. This can prevent image-capturing from being affected even in a case where the surroundings are captured by the gimbal camera 23, for example.

In step S54, the control unit 97 instructs the battery movable part 25 to move the battery 121, and causes the battery movable part 25 to move the battery 121 to the strong wind countermeasure position. That is, the control unit 97 controls the movement of the battery 121 by the battery movable part 25.

The battery movable part 25 moves the battery 121 from an arbitrary position such as a normal position to a strong wind countermeasure position in accordance with the instruction of the control unit 97.

It is to be noted that in a case where the battery 121 is already in the strong wind countermeasure position, the processing of step S54 is not performed, and the state in which the battery 121 is in the strong wind countermeasure position is maintained.

Furthermore, in more details, for example, due to adjustment of the position of the center of gravity of the airframe, the distance d≠d', i.e., the distance d and the distance d' are sometimes not equal to each other.

In such a case, the battery movable part 25 moves the battery 121a and the battery 121b so that the battery 121 positioned farther from the airframe center position is positioned farthest from the airframe center position within the movable range while maintaining the relative positional relationship between the battery 121a and the battery 121b with respect to the airframe center position.

In other words, each battery 121 is moved so that the battery 121 positioned farther from the airframe center position is positioned at the position of the strong wind countermeasure position while maintaining the relative positional relationship between the battery 121a and the battery 121b with respect to the airframe center position. This can maximize the moment of inertia of the airframe while the position of the center of gravity of the airframe remains at the airframe center position.

After the battery 121 is moved to the strong wind countermeasure position in this manner, the processing proceeds to step S56.

On the other hand, in a case where it is determined in step S52 that the strong wind countermeasures are not to be taken, i.e., in a case where no strong wind is expected to occur in the predetermined period in the future direction and the strong wind countermeasures are not required, the processing proceeds to step S55.

In step S55, the control unit 97 instructs the battery movable part 25 to move the battery 121, and causes the battery movable part 25 to move the battery 121 to the normal position. The battery movable part 25 moves the battery 121 to the normal position in accordance with the instruction of the control unit 97.

It is to be noted that in a case where the battery 121 is already in the normal position, the processing of step S55 is not performed, and the state in which the position of the battery 121 is at the normal position is maintained.

Furthermore, in more details, for example, due to adjustment of the position of the center of gravity of the airframe, the distance d≠d', i.e., the distance d and the distance d' are sometimes not equal to each other.

In such a case, the battery movable part 25 moves the battery 121a and the battery 121b so that the battery 121 present at a position closer to the airframe center position is in the normal position while maintaining the relative positional relationship between the battery 121a and the battery 121b with respect to the airframe center position. This can ends the strong wind countermeasures while the position of the center of gravity of the airframe remains at the airframe center position.

After the battery 121 is moved to the normal position in this manner, the processing proceeds to step S56.

When the processing of step S54 or step S55 is performed, the control unit 97 determines in step S56 whether or not to end the processing in operation. For example, in step S56, it is determined that the processing is ended in a case where the flight of the unmanned aerial vehicle 11 is ended.

In a case where it is determined in step S56 that the processing is not yet ended, the processing returns to step S51 and the processing described above is repeated.

On the other hand, in a case where it is determined in step S56 that the processing is to be ended, the processing performed by each unit of the unmanned aerial vehicle 11 is stopped, and the strong wind countermeasure control processing is ended.

As described above, the unmanned aerial vehicle 11 acquires strong wind prediction information, changes the orientation of the airframe in accordance with the strong wind prediction information, moves the battery 121, and thus increases the moment of inertia. By doing so, it is possible to easily suppress the inclination of the airframe without changing the total weight of the airframe even at the time of strong wind. That is, it is possible to easily balance an airframe.

<Configuration Example of Computer>

Incidentally, the series of processing described above can be executed by hardware or can be executed by software. In a case where the series of processing is executed by software, a program constituting the software is installed into a computer. Here, the computer includes a computer incorporated in dedicated hardware and the like.

Figure 9:
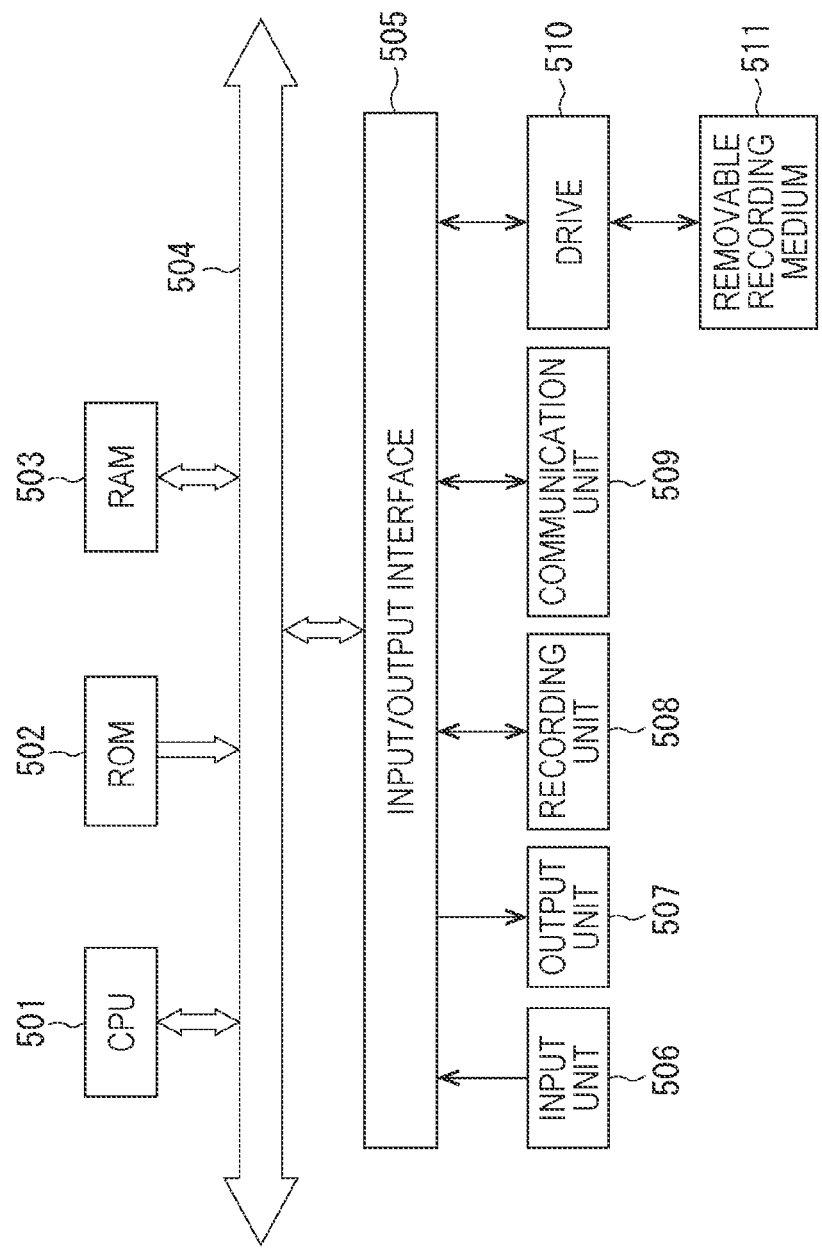
FIG. 9 is a diagram showing a configuration example of a computer.

FIG. 9 is a block diagram showing a configuration example of hardware of a computer in which a program executes the series of processing described above.

In a computer, a central processing unit (CPU) 501, a read only memory (ROM) 502, and a random access memory (RAM) 503 are interconnected by a bus 504.

An input/output interface 505 is further connected to the bus 504. An input unit 506, an output unit 507, a recording unit 508, a communication unit 509, and a drive 510 are connected to the input/output interface 505.

The input unit 506 includes a switch, a button, a microphone, an imaging element, and the like. The output unit 507 includes a display, a speaker, and the like. The recording unit 508 includes a hard disk and a nonvolatile memory. The communication unit 509 includes a network interface and the like. The drive 510 drives a removable recording medium 511 such as a magnetic disk, an optical disk, a magneto-optical disk, or a semiconductor memory.

In the computer configured as above, the CPU 501 loads and executes a program recorded in the recording unit 508, for example, into the RAM 503 via the input/output interface 505 and the bus 504, and thus the series of processing described above is performed.

A program executed by the computer (CPU 501) can be provided by being recorded in the removable recording medium 511 as a package medium, for example. In addition, the program can also be provided via a wired or wireless transmission medium, such as a local area network, the Internet, or digital satellite broadcasting.

In the computer, the program can be installed into the recording unit 508 via the input/output interface 505 by mounting the removable recording medium 511 into the drive 510. In addition, the program can be received by the communication unit 509 via a wired or wireless transmission medium and installed into the recording unit 508. In addition, the program can be installed in advance into the ROM 502 or the recording unit 508.

It is to be noted that the program executed by the computer may be a program in which processing is performed in time-series in accordance with the order described in the present description, or may be a program in which processing is performed in parallel or at a necessary timing such as when a call is made.

The embodiment of the present technology is not limited to the embodiments described above, and various modifications may be made without departing from the scope of the present technology.

For example, the present technology can take a configuration of cloud computing, in which one function is shared by a plurality of devices via a network and is processed jointly.

In addition, each step described in the above flowcharts can be executed by one device or by a plurality of devices.

Furthermore, in a case where a plurality of processes is included in one step, the plurality of processes included in the one step can be executed by one device or by shared and executed by a plurality of devices.

Furthermore, the present technology can have the following configurations.

(1)

An unmanned aerial vehicle including:

a plurality of motors that rotates a plurality of propellers;

a movable part that moves a center-of-gravity position adjustment member; and a control unit that controls movement of the center-of-gravity position adjustment member by the movable part.

(2)

The unmanned aerial vehicle according to (1), in which the movable part moves the center-of-gravity position adjustment member while maintaining a positional relationship between the plurality of the propellers and an airframe of the unmanned aerial vehicle.

(3)

The unmanned aerial vehicle according to (1) or (2), in which the control unit controls movement of the center-of-gravity position adjustment member on the basis of a difference between a rotation speed of a predetermined one of the motors and a rotation speed of another one of the motors, and the movable part moves the center-of-gravity position adjustment member in a case where the difference is not a value within a predetermined range.

(4)

The unmanned aerial vehicle according to (3), in which the predetermined range is determined on the basis of an increase amount in weight of the unmanned aerial vehicle.

(5)

The unmanned aerial vehicle according to any one of (1) to (4), further including a recording unit that records position information indicating a position of the center-of-gravity position adjustment member after movement.

(6)

The unmanned aerial vehicle according to (5), in which in a case where the position information is recorded in the recording unit, the movable part moves the center-of-gravity position adjustment member to a position indicated by the position information.

(7)

The unmanned aerial vehicle according to (5), further including:

a weight measurement unit that measures an increase amount in weight of the unmanned aerial vehicle, in which the recording unit records weight information indicating the increase amount and the position information corresponding to the weight information in association with each other, and in a case where the position information associated with the weight information indicating the increase amount measured by the weight measurement unit is recorded in the recording unit, the movable part moves the center-of-gravity position adjustment member to a position indicated by the position information.

(8)

The unmanned aerial vehicle according to any one of (1) to (7), in which the center-of-gravity position adjustment member is a battery.

(9)

The unmanned aerial vehicle according to any one of (1) to (7), in which the center-of-gravity position adjustment member is a payload.

(10)

The unmanned aerial vehicle according to any one of (1) to (9), in which a plurality of the center-of-gravity position adjustment members is provided.

(11)

The unmanned aerial vehicle according to (10), in which the control unit adjusts an orientation of an airframe of the unmanned aerial vehicle on the basis of prediction information indicating a direction and force of a generated wind, and controls movement of the center-of-gravity position adjustment member by the movable part so that the plurality of center-of-gravity position adjustment members is moved in a plurality of directions different from one another and away from a center position of the airframe.

(12)

A drive method, in which an unmanned aerial vehicle including a plurality of motors that rotates a plurality of propellers, and a movable part that moves a center-of-gravity position adjustment member controls movement of the center-of-gravity position adjustment member by the movable part.

(13)

A program that causes a computer that controls an unmanned aerial vehicle including a plurality of motors that rotates a plurality of propellers, and a movable part that moves a center-of-gravity position adjustment member to execute processing including a step of controlling movement of the center-of-gravity position adjustment member by the movable part.

(14)

An unmanned aerial vehicle including a movable part that moves a plurality of adjustment members, and a control unit that adjusts an orientation of an airframe on the basis of prediction information indicating a direction and force of a generated wind, and that controls movement of the adjustment members by the movable part so that the plurality of the adjustment members is moved in a plurality of directions different from one another and away from a center position of the airframe.

(15)

The unmanned aerial vehicle according to (14), in which in a case where a wind force indicated by the prediction information is equal to or greater than a predetermined threshold value, the control unit adjusts an orientation of the airframe and controls movement of the adjustment member.

(16)

The unmanned aerial vehicle according to (14) or (15), in which the control unit adjusts an orientation of the airframe so that a direction of the wind indicated by the prediction information and a movable direction of the adjustment member become parallel to each other.

(17)

The unmanned aerial vehicle according to any one of (14) to (16), further including an acquisition unit that acquires the prediction information.

(18)

The unmanned aerial vehicle according to (17), in which the acquisition unit transmits position information indicating a position of the unmanned aerial vehicle, and receives the prediction information corresponding to a position indicated by the position information.

(19)

The unmanned aerial vehicle according to any one of (14) to (16), further including:

a prediction unit that generates the prediction information on the basis of at least any one of time-series data of a wind observation result at a position where the unmanned aerial vehicle is present or time-series data of inclination and acceleration of the unmanned aerial vehicle.

(20)

The unmanned aerial vehicle according to any one of (14) to (19), in which the control unit adjusts an orientation of a camera in accordance with adjustment of an orientation of the airframe.

(21)

The unmanned aerial vehicle according to any one of (14) to (20), in which the movable part moves the plurality of the adjustment members without changing a position of a center of gravity of the airframe.

(22)

A drive method, in which an unmanned aerial vehicle having a movable part that moves a plurality of adjustment members adjusts an orientation of an airframe on the basis of prediction information indicating a direction and force of a generated wind, and controls movement of the adjustment members by the movable part so that the plurality of the adjustment members is moved in a plurality of directions different from one another and away from a center position of the airframe.

(23)

A program that causes a computer that controls an unmanned aerial vehicle having a movable part that moves a plurality of adjustment members to execute processing including a step of adjusting an orientation of an airframe on the basis of prediction information indicating a direction and force of a generated wind, and controlling movement of the adjustment members by the movable part so that the plurality of the adjustment members is moved in a plurality of directions different from one another and away from a center position of the airframe.

REFERENCE SIGNS LIST

11 Unmanned aerial vehicle
21a, 21b, 21 Propeller
22a, 22b, 22 Motor
24 Battery
25 Battery movable part
94 Weight measurement unit
95 Inclination detection unit
96 Recording unit
97 Control unit
151 Strong wind information acquisition unit
161 Communication unit
162 Sensor unit
163 Prediction unit

The invention claimed is:

1. An unmanned aerial vehicle, comprising:
a plurality of motors configured to rotate a plurality of propellers;
a movable part configured to move a center-of-gravity position adjustment member; and
a control unit configured to control the movement of the center-of-gravity position adjustment member by the movable part, based on a difference between a first rotation speed of a first motor of the plurality of motors and a second rotation speed of a second motor of the plurality of motors, wherein
the movable part moves the center-of-gravity position adjustment member in a case where the difference is not a value within a predetermined range, and
the predetermined range is based on of an increase amount in weight of the unmanned aerial vehicle.

2. The unmanned aerial vehicle according to claim 1, wherein
the movable part moves the center-of-gravity position adjustment member without changing a positional relationship between the plurality of the propellers and an airframe of the unmanned aerial vehicle.

3. The unmanned aerial vehicle according to claim 1, further comprising:
a recording unit configured to record position information indicating a position of the center-of-gravity position adjustment member after the movement.

4. The unmanned aerial vehicle according to claim 3, wherein
in a case where the position information is recorded in the recording unit, the movable part is configured to move the center-of-gravity position adjustment member to the position indicated by the position information.

5. The unmanned aerial vehicle according to claim 3, further comprising:
a weight measurement unit configured to measure the increase amount in the weight of the unmanned aerial vehicle, wherein the recording unit configured to record weight information indicating the increase amount and the position information corresponding to the weight information in association with each other, and in a case where the position information associated with the weight information indicating the increase amount measured by the weight measurement unit is recorded in the recording unit, the movable part is configured to move the center-of-gravity position adjustment member to the position indicated by the position information.

6. The unmanned aerial vehicle according to claim 1, wherein
the center-of-gravity position adjustment member is a battery.

7. The unmanned aerial vehicle according to claim 1, wherein
the center-of-gravity position adjustment member is a payload.

8. The unmanned aerial vehicle according to claim 1, wherein
a plurality of the center-of-gravity position adjustment members is provided.

9. The unmanned aerial vehicle according to claim 8, wherein
the control unit is configured to:
adjust an orientation of an airframe of the unmanned aerial vehicle based on prediction information indicating a direction and force of a generated wind; and
control the movement of the center-of-gravity position adjustment member by the movable part so that the plurality of center-of-gravity position adjustment members is moved in a plurality of directions different from one another and away from a center position of the airframe.

10. A drive method of an unmanned aerial vehicle, comprising:
rotating, by a plurality of motors, a plurality of propellers; and
moving, by a movable part, a center-of-gravity position adjustment member; and
controlling, by a control unit, the movement of the center-of-gravity position adjustment member by the movable part, based on a difference between a first rotation speed of a first motor of the plurality of motors and a second rotation speed of a second motor of the plurality of motors, wherein
the movable part moves the center-of-gravity position adjustment member in a case where the difference is not a value within a predetermined range, and
the predetermined range is based on of an increase amount in weight of the unmanned aerial vehicle.

11. A non-transitory computer-readable medium having stored thereon, computer-executable instructions that when executed by a computer that controls an unmanned aerial vehicle, causes the computer to execute operations, the operations comprising:
rotating, by a plurality of motors, a plurality of propellers; and
moving, by a movable part, a center-of-gravity position adjustment member; and
controlling, by a control unit, the movement of the center-of-gravity position adjustment member by the movable part, based on a difference between a first rotation speed of a first motor of the plurality of motors and a second rotation speed of a second motor of the plurality of motors, wherein
the movable part moves the center-of-gravity position adjustment member in a case where the difference is not a value within a predetermined range, and
the predetermined range is based on of an increase amount in weight of the unmanned aerial vehicle.

12. An unmanned aerial vehicle, comprising:
a movable part configured to move a plurality of adjustment members; and
a control unit configured to:
adjust an orientation of an airframe based on a basis of prediction information indicating a direction and force of a generated wind; and
control the movement of the plurality of adjustment members by the movable part so that the plurality of the adjustment members is moved in a plurality of directions different from one another and away from a center position of the airframe.

13. The unmanned aerial vehicle according to claim 12, wherein
in a case where a wind force indicated by the prediction information is equal to or greater than a predetermined threshold value, the control unit is configured to:
adjust the orientation of the airframe; and
control the movement of the plurality of adjustment members.

14. The unmanned aerial vehicle according to claim 12, wherein
the control unit is configured to adjust the orientation of the airframe so that a direction of the generated wind indicated by the prediction information and a movable direction of an adjustment member of the plurality of adjustment members become parallel to each other.

15. The unmanned aerial vehicle according to claim 12, further comprising:
an acquisition unit configured to acquire the prediction information.

16. The unmanned aerial vehicle according to claim 15, wherein
the acquisition unit is configured to:
transmit position information indicating a position of the unmanned aerial vehicle; and
receive prediction information corresponding to the position indicated by the position information.

17. The unmanned aerial vehicle according to claim 12, further comprising:
a prediction unit configured to generate the prediction information based on at least any one of time-series data of a wind observation result at a position where the unmanned aerial vehicle is present or time-series data of inclination and acceleration of the unmanned aerial vehicle.

18. The unmanned aerial vehicle according to claim 12, wherein
the control unit is configured to adjust an orientation of a camera in accordance with the adjustment of the orientation of the airframe.

19. The unmanned aerial vehicle according to claim 12, wherein
the movable part is configured to move the plurality of the adjustment members without changing a position of a center-of-gravity of the airframe.

20. A drive method of an unmanned aerial vehicle, comprising:
moving, by a movable part, a plurality of adjustment members;

adjusting, by a control unit, an orientation of an airframe based on prediction information indicating a direction and force of a generated wind; and controlling, by the control unit, the movement of the plurality of adjustment members by the movable part so that the plurality of the adjustment members is moved in a plurality of directions different from one another and away from a center position of the airframe.

21. A non-transitory computer-readable medium having stored thereon, computer-executable instructions that when executed by a computer that controls an unmanned aerial vehicle, causes the computer to execute operations, the operations comprising:

moving, by a movable part, a plurality of adjustment members;

adjusting, by a control unit, an orientation of an airframe based on prediction information indicating a direction and force of a generated wind; and controlling, by a control unit, the movement of the plurality of adjustment members by the movable part so that the plurality of the adjustment members is moved in a plurality of directions different from one another and away from a center position of the airframe.

* * * * *